US012646881B2

(12) United States Patent
Cavallieri et al.

(10) Patent No.: US 12,646,881 B2
(45) Date of Patent: Jun. 2, 2026

(54) HEADER POWER CONNECTOR

(71) Applicant: TE Connectivity Solutions GmbH, Schaffhausen (CH)

(72) Inventors: Amadeu Luiz Fazani Cavallieri, Campinas (BR); Madan Kumara Mudagre Chandra Kumara, Sonnenahalli Village (IN); Vinay KC, Sonnenahalli Village (IN); Akhil Rajan, Sonnenahalli Village (IN)

(73) Assignee: TE Connectivity Solutions GmbH (CH)

( * ) Notice: Subject to any disclaimer, the term of this patent is extended or adjusted under 35 U.S.C. 154(b) by 275 days.

(21) Appl. No.: 18/598,808

(22) Filed: Mar. 7, 2024

(65) Prior Publication Data

US 2024/0213700 A1 Jun. 27, 2024

Related U.S. Application Data

(63) Continuation-in-part of application No. 18/082,704, filed on Dec. 16, 2022.

(51) Int. Cl.
*H01R 13/15* (2006.01)
*H01R 12/72* (2011.01)
*H01R 13/514* (2006.01)

(52) U.S. Cl.
CPC ........... *H01R 13/15* (2013.01); *H01R 12/724* (2013.01); *H01R 13/514* (2013.01)

(58) Field of Classification Search
CPC ............ H01R 13/62922; H01R 13/057; H01R 13/502; H01R 13/631; H01R 13/639; H01R 13/15; H01R 13/514; H01R 12/724
USPC .......................................................... 439/676
See application file for complete search history.

(56) References Cited

U.S. PATENT DOCUMENTS 4,212,510 A * 7/1980 Ritchie .............. H01R 13/7197 333/183
4,295,390 A * 10/1981 Buchta .................... F15B 13/10 74/625
5,630,734 A * 5/1997 Phillips, Jr. .......... H01R 13/719 333/182
6,743,052 B1 * 6/2004 Lin ...................... H01R 31/065 439/620.15
2015/0288094 A1 * 10/2015 Lerner ................. H01R 13/005 156/60

* cited by examiner

*Primary Examiner* — Gary F Paumen

(57) ABSTRACT

A header power connector includes a header housing assembly having an outer housing with an outer wall forming a cavity and a separating wall separating the cavity into a choke chamber and a terminal chamber. The outer housing is configured to receive an upper busbar through the top and a lower busbar through the bottom. An inner housing is received in the terminal chamber and holds a terminal assembly with terminals arranged in a terminal stack configured to electrically connect the upper and lower busbars. The header power connector includes a choke received in the choke chamber between the outer wall and the separating wall. The choke has a choke body surrounding the terminal assembly. The choke body has an opening therethrough receiving the terminal assembly.

20 Claims, 21 Drawing Sheets

HEADER POWER CONNECTOR

CROSS REFERENCE TO RELATED APPLICATIONS

This application is a continuation-in-part of U.S. application Ser. No. 18/082,704, filed 16 Dec. 2022 and claims the benefit of IN Application No. 202441010574, filed 15 Feb. 2024, the subject matter of which is herein incorporated by reference in its entirety.

BACKGROUND OF THE INVENTION

The subject matter herein relates generally to header power connectors.

Power connectors are used to transfer power between electrical components. For example, in an electric vehicle, a power connector is used to electrically connect an inverter with an electric motor. Typically, the power is supplied by coupling a cable mounted plug connector to a header power connector. The plug connector may be manipulated and moved into position for mating with the header power connector. The plug connector increases overall cost of the system being an extra component extending between the electrical components. There is a desire to directly couple the electrical components to the header power connector, such as to eliminate the plug connector and thus reduce the number of components and the cost of the system. However, alignment of the electrical components with the header power connector is difficult and may lead to improper mating and damage to the components.

Additionally, interference between the components, such as electromagnetic interference (EMI) is problematic in the header power connector. Adding filters, such as a common mode current filter or choke, to the header power connector may reduce EMI. However, the choke may cause damage to the header power connector over time, such as due to movement of the choke within the header power connector from vibration which may damage the terminals, the busbars, the housing, or other components of the header power connector. The choke is a heavy component that demands good stability because it can move inside the housing and touch the terminal assemblies inside the cavity. The result of the mechanical movements generated by vibration and external mechanical shock is ear, resistance increase in the terminals, over heating and possibly thermal events. The choke may limit movement or alignment of the electrical components during mating.

A need remains for a header power connector having improved mating tolerances.

BRIEF DESCRIPTION OF THE INVENTION

In one embodiment, a header power connector is provided and includes a header housing assembly including an outer housing having an outer wall forming a cavity. The outer housing extends between a top and a bottom. The outer housing configured to receive an upper busbar in the cavity through the top. The outer housing configured to receive a lower busbar in the cavity through the bottom. The header housing assembly includes an inner housing received in the cavity. The inner housing includes a terminal channel. The header power connector includes a terminal assembly held in the terminal channel of the inner housing. The terminal assembly received in the cavity. The terminal assembly includes a plurality of terminals arranged in a terminal stack. Each terminal includes an upper mating end has an upper socket configured to receive the upper busbar and a lower mating end has a lower socket configured to receive the lower busbar. The terminals configured to electrically connect the upper and lower busbars. The header power connector includes a choke received in the cavity. The choke has a choke body surrounding the terminal assembly. The choke body has an opening therethrough receiving the terminal assembly. The header power connector includes a choke positioner in the cavity. The choke positioner interfaces with the choke to position the choke relative to the outer housing.

In another embodiment, a header power connector is provided and includes a header housing assembly including an outer housing having an outer wall forming a cavity. The outer housing extends between a top and a bottom. The outer housing has a first side and a second side. The outer housing has a front and a rear. The outer housing configured to receive an upper busbar in the cavity through the top. The outer housing configured to receive a lower busbar in the cavity through the bottom. The header housing assembly includes an inner housing received in the cavity. The inner housing includes a terminal channel. The header power connector includes a terminal assembly held in the terminal channel of the inner housing. The terminal assembly received in the cavity. The terminal assembly includes a plurality of terminals arranged in a terminal stack. Each terminal includes an upper mating end has an upper socket configured to receive the upper busbar and a lower mating end has a lower socket configured to receive the lower busbar. The terminals configured to electrically connect the upper and lower busbars. The header power connector includes a choke received in the cavity. The choke has a choke body surrounding the terminal assembly. The choke body has an opening therethrough receiving the terminal assembly. The header power connector includes a horizontal choke positioner in the cavity. The choke positioner interfaces with the choke to horizontally position the choke relative to the outer housing between the first side and the second side. The header power connector includes a vertical choke positioner in the cavity. The choke positioner interfaces with the choke to vertically position the choke relative to the outer housing between the top and the bottom.

In a further embodiment, a power connector system is provided and includes an upper busbar for powering a first electrical component. The upper busbar has an upper busbar edge. The power connector system includes a lower busbar for powering a second electrical component. The lower busbar has a lower busbar edge. The power connector system includes a header power connector for electrically connecting the upper busbar with the lower busbar to transfer power between the first and second electrical components. The header power connector includes a header housing assembly including an outer housing having an outer wall forming a cavity. The outer housing extends between a top and a bottom. The outer housing receiving the upper busbar in the cavity through the top. The outer housing receiving the lower busbar in the cavity through the bottom. The header housing assembly includes an inner housing received in the cavity. The inner housing includes a terminal channel. The header power connector includes a terminal assembly held in the terminal channel of the inner housing. The terminal assembly received in the cavity. The terminal assembly includes a plurality of terminals arranged in a terminal stack. Each terminal includes an upper mating end has an upper socket configured to receive the upper busbar and a lower mating end has a lower socket configured to receive the lower busbar. The terminals configured to electrically connect the upper and lower busbars. The header power connector includes a choke received in the cavity. The choke has a choke body surrounding the terminal assembly. The choke body has an opening therethrough receiving the terminal assembly. The header power connector includes a choke positioner in the cavity. The choke positioner interfaces with the choke to position the choke relative to the outer housing.

In one embodiment, a header power connector is provided and includes a header housing assembly which includes an outer housing that has an outer wall forming a cavity and a separating wall separating the cavity into a choke chamber and a terminal chamber. The outer housing extends between a top and a bottom. The outer housing is configured to receive an upper busbar in the cavity through the top. The outer housing is configured to receive a lower busbar in the cavity through the bottom. The header housing assembly includes an inner housing received in the terminal chamber. The inner housing includes a terminal channel. The header power connector includes a terminal assembly received in the terminal chamber. The terminal assembly is held in the terminal channel of the inner housing. The terminal assembly includes a plurality of terminals arranged in a terminal stack. Each terminal includes an upper mating end that has an upper socket configured to receive the upper busbar and a lower mating end that has a lower socket configured to receive the lower busbar. The terminals configured to electrically connect the upper and lower busbars. The header power connector includes a choke received in the choke chamber between the outer wall and the separating wall. The choke has a choke body surrounding the terminal assembly. The choke body has an opening therethrough receiving the terminal assembly.

In another embodiment, a header power connector is provided and includes a header housing assembly which includes an outer housing that has an outer wall forming a cavity and a separating wall separating the cavity into a choke chamber and a terminal chamber. The outer housing extends between a top and a bottom. The outer housing has a first side and a second side. The outer housing has a front and a rear. The outer housing is configured to receive an upper busbar in the cavity through the top. The outer housing is configured to receive a lower busbar in the cavity through the bottom. The header housing assembly includes an inner housing received in the terminal chamber. The inner housing includes a terminal channel. The header power connector includes a terminal assembly received in the terminal chamber. The terminal assembly is held in the terminal channel of the inner housing. The terminal assembly is received in the cavity. The terminal assembly includes a plurality of terminals arranged in a terminal stack. Each terminal includes an upper mating end that has an upper socket configured to receive the upper busbar and a lower mating end that has a lower socket configured to receive the lower busbar. The terminals are configured to electrically connect the upper and lower busbars. The header power connector includes a choke received in the choke chamber between the outer wall and the separating wall. The choke has a choke body surrounding the terminal assembly. The choke body has an opening therethrough receiving the terminal assembly. The header power connector includes a horizontal choke positioner in the choke chamber. The choke positioner interfacing with the choke to horizontally position the choke relative to the outer housing between the first side and the second side. The header power connector includes a vertical choke positioner in the choke chamber. The choke positioner interfaces with the choke to vertically position the choke relative to the outer housing between the top and the bottom.

In a further embodiment, a power connector system is provided and includes an upper busbar for powering a first electrical component. The upper busbar has an upper busbar edge. The power connector system includes a lower busbar for powering a second electrical component. The lower busbar has a lower busbar edge. The power connector system includes a header power connector for electrically connecting the upper busbar with the lower busbar to transfer power between the first and second electrical components. The header power connector includes a header housing assembly which includes an outer housing has an outer wall forming a cavity and a separating wall separating the cavity into a choke chamber and a terminal chamber. The outer housing extends between a top and a bottom. The outer housing receives the upper busbar in the cavity through the top. The outer housing receives the lower busbar in the cavity through the bottom. The header housing assembly includes an inner housing received in the terminal chamber. The inner housing includes a terminal channel. The header power connector includes a terminal assembly received in the terminal chamber. The terminal assembly is held in the terminal channel of the inner housing. The terminal assembly received in the cavity. The terminal assembly includes a plurality of terminals arranged in a terminal stack. Each terminal includes an upper mating end that has an upper socket configured to receive the upper busbar and a lower mating end that has a lower socket configured to receive the lower busbar. The terminals configured to electrically connect the upper and lower busbars. The header power connector includes a choke received in the choke chamber between the outer wall and the separating wall. The choke has a chock body surrounding the terminal assembly. The choke body has an opening therethrough receiving the terminal assembly.

DETAILED DESCRIPTION OF THE INVENTION

Figure 1:
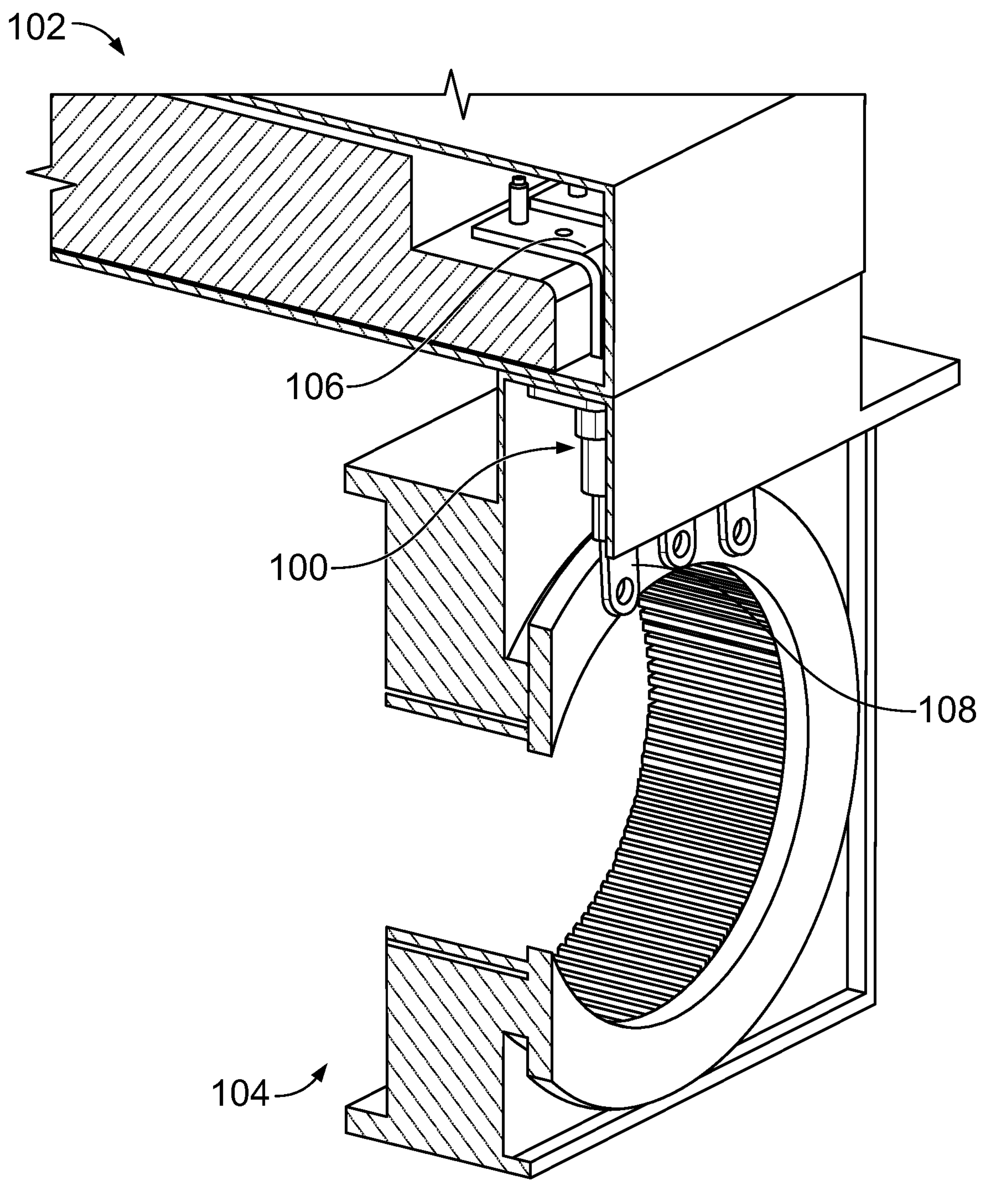
FIG. 1 is a schematic view of a header power connector in accordance with an exemplary embodiment.

FIG. 1 is a schematic view of a header power connector 100 in accordance with an exemplary embodiment. The header power connector 100 is used to electrically connect a first electrical component 102 and a second electrical component 104. In various embodiments, the first and second electrical components 102, 104 may be part of an electric vehicle. For example, the first electrical component 102 may be an inverter and the second electrical component 104 may be an electric motor. The header power connector 100 may be used to electrically connect other types of electrical components in alternative embodiments. In an exemplary embodiment, the header power connector 100 is mounted to the first electrical component 102 and mated with the second electrical component 104 when the first electrical component 102 is coupled to the second electrical component 104.

In an exemplary embodiment, the first electrical component 102 includes a first busbar 106 and the second electrical component 104 includes a second busbar 108. The first and second busbars 106, 108 are configured to be plugged directly into opposite ends of the header power connector 100. The header power connector 100 electrically connects the first and second busbars 106, 108 to transmit power between the first and second electrical components 102, 104.

Figure 2:
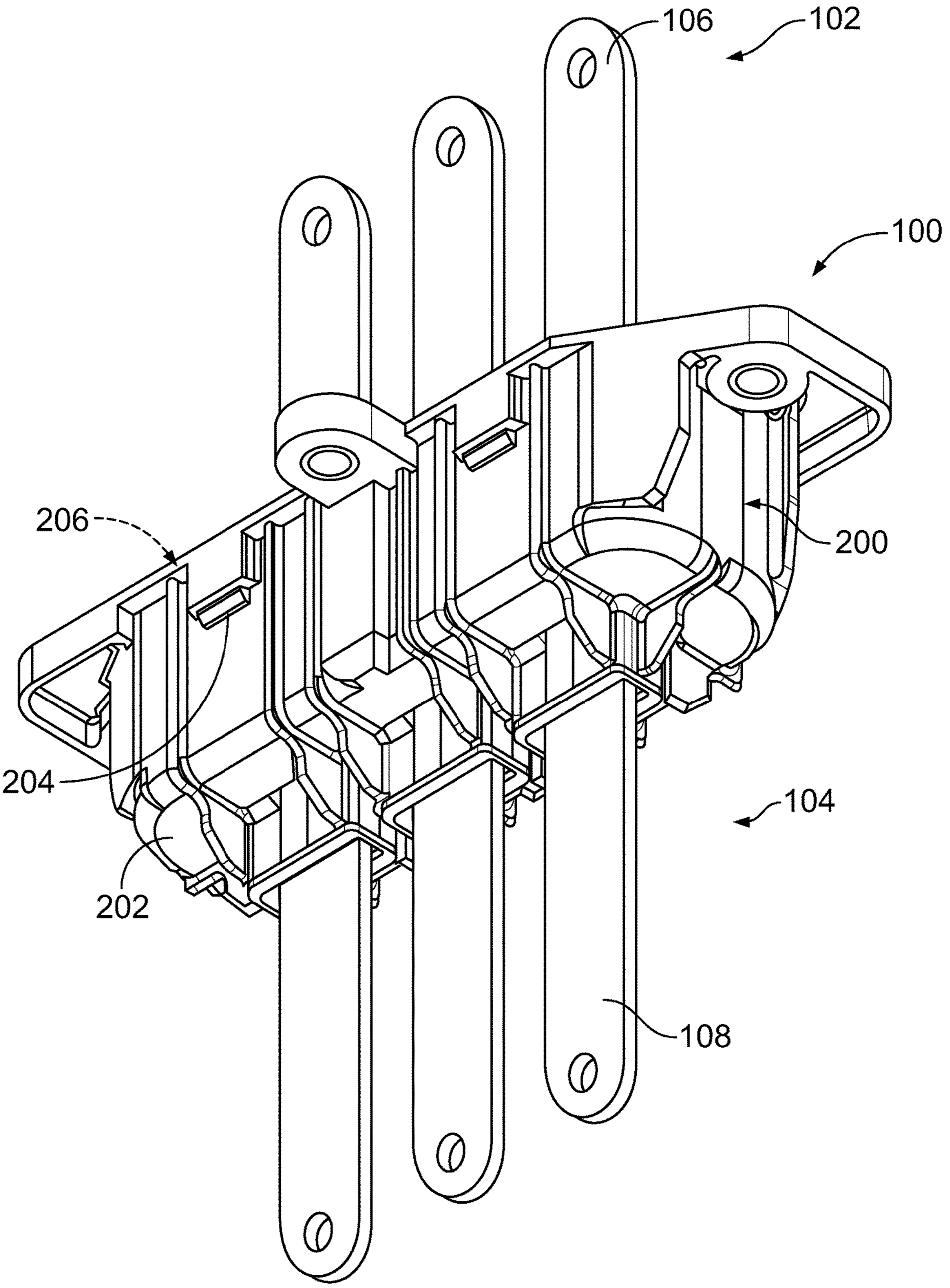
FIG. 2 is a perspective view of the header power connector in accordance with an exemplary embodiment.

FIG. 2 is a perspective view of the header power connector 100 in accordance with an exemplary embodiment. FIG. 2 illustrates portions of the first and second electrical components 102, 104. FIG. 2 illustrates the first and second busbars 106, 108. In an exemplary embodiment, the header power connector 100 is used to electrically connect a plurality of the first busbars 106 (for example, three busbars) with a corresponding plurality of the second busbars 108 (for example, three busbars). The first busbars 106 are metal plates, such as copper plates. The second busbars 108 are metal plates, such as copper plates.

The header power connector 100 is located between the first electrical component 102 and the second electrical component 104. The busbars 106 of the first electrical component 102 are configured to be plugged directly into the header power connector 100. The busbars 108 of the second electrical component 104 are configured to be plugged directly into the header power connector 100, such as an opposite end of the header power connector 100. Optionally, the header power connector 100 may be initially mounted to the first electrical component 102 (or the second electrical component 104) and mated to the second electrical component 104 (or the first electrical component 102) when the first electrical component 102 is mounted to the second electrical component 104.

The header power connector 100 includes a header housing assembly 200 and one or more terminal assemblies held by the header housing assembly 200. In an exemplary embodiment, the header housing assembly 200 is a multipiece housing assembly. For example, the header housing assembly 200 includes an outer housing 202 and an inner housing 204. The inner housing 204 holds the terminal assemblies. The inner housing 204 is received in a cavity 206 of the outer housing 202. In an exemplary embodiment, the outer housing 202 is configured to be mounted to one of the electrical components, such as the first electrical component 102. In an exemplary embodiment, the inner housing 204 is movable relative to the outer housing 202 to accommodate alignment and mating with the first electrical component 102. For example, the inner housing 204 may be tilted or rotated within the outer housing 202 to accommodate misalignment of the first and second busbars 106, 108. The inner housing 204 has a limited amount of contained movement relative to the outer housing 202. The outer housing 202 is shaped to control and contained the movement of the inner housing 204 during mating. For example, the outer housing 202 may allow the inner housing 204 to rotate a predetermined amount to allow mating with the busbars 106 of the first electrical component 102 during mating therewith. In an exemplary embodiment, the terminals of the terminal assemblies also have a limited amount of contained movement relative to the inner housing 204 to accommodate the misalignment of the first and second busbars 106, 108 during mating.

Figure 3:
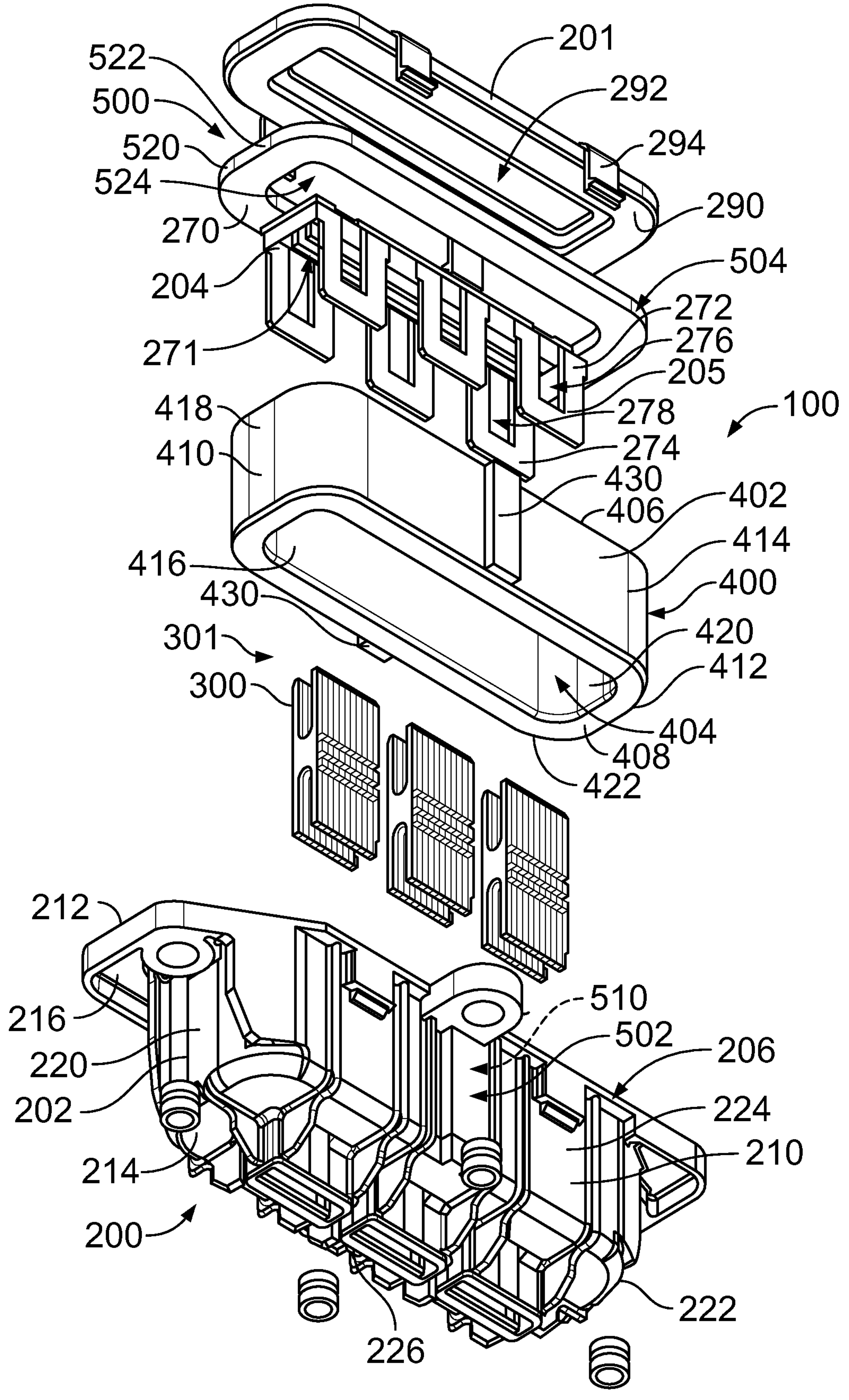
FIG. 3 is an exploded view of the header power connector in accordance with an exemplary embodiment.

FIG. 3 is an exploded view of the header power connector 100 in accordance with an exemplary embodiment. The header power connector 100 includes the header housing assembly 200, a plurality of the terminal assemblies 301 held by the header housing assembly 200, a choke 400 held by the header housing assembly 200, and a choke positioner 500 for positioning the choke 400 in the header housing assembly 200. The choke 400 surrounds the terminal assemblies 301 to cancel EMI for high frequency electronic noise suppression for the terminal assemblies 301. The choke 400 improves operation of the header power connector 100.

In an exemplary embodiment, the header housing assembly 200 includes the outer housing 202, the inner housing 204, and a cover 201 coupled to the outer housing 202 to hold the other components in the outer housing 202. In an exemplary embodiment, the inner housing 204 includes a terminal assembly retainer 205 configured to be coupled to the outer housing 202. The header housing assembly 200 may include greater or fewer parts in alternative embodiments. For example, the inner housing 204 may include a terminal holder, which may be located within the cavity of the outer housing 202. Additionally, while the parts are shown as separate, discrete components in the illustrated embodiment, various parts may be integrated into integral structures in alternative embodiments. For example, the terminal holder may be an integral, unitary structure with the outer housing 202 in alternative embodiments.

The outer housing 202 includes an outer wall 210 surrounding the cavity 206. The outer wall 210 extends between an upper end 212 and a lower end 214 of the outer housing 202. In an exemplary embodiment, the upper end 212 is configured to be mounted to the first electrical component 102 such that the header power connector 100 extends from the bottom of the first electrical connector 102. Other mounting orientations are possible in alternative embodiments. For example, the header power connector 100 may be oriented such that the end 212 defines a bottom of the outer housing 202, such as when the outer housing 202 is mounted to the top of the structure, such as one of the electrical components. In other various embodiments, the outer housing 202 may be oriented such that neither of the ends 212, 214 are at the top or the bottom, but rather define sides of the outer housing 202. The terms upper and lower are used herein in reference to the orientation illustrated in the figures.

The outer housing 202 includes mounting flanges 216 at opposite sides 220, 222 of the outer housing 202. The mounting flanges 216 may receive fasteners to secure the outer housing 202 to the first electrical component 102. The outer housing 202 includes a front 224 and a rear 226 extending between the sides 220, 222. The cavity 206 is formed between the front 224 and the rear 226. The cavity 206 extends between the first side 220 and the second side 222. The cavity 206 is open to receive the inner housing 204, the terminal assemblies 301, the choke 400 and the choke positioner 500.

The outer housing 202 may include latching features (not shown) used to secure the inner housing 204 to the outer housing 202. The latching features may be deflectable latching tabs configured to engage corresponding latching features of the inner housing 204. The latching features may be releasable to release the inner housing 204 from the outer housing 202.

The outer housing 202 may include walls or other features that form terminal channels configured to receive corresponding terminal assemblies 301 therein. The terminal channels may be open at an upper end and a lower end to receive the busbars 106, 108, respectively. The walls guide the busbars 106, 108 into the terminal channels to mate with the terminal assemblies 301. Optionally, the walls may include chamfered lead-in surfaces that guide the busbars 106, 108 into the terminal channels.

The terminal assembly retainer 205 includes an end wall 270 and side walls 272, 274 extending from the end wall 270. The end wall 270 includes slots 271 configured to receive the busbars 106. The side walls 272, 274 include openings 276, 278 that receive latching features to secure the terminal assembly retainer 205 to the outer housing 202. The side walls 272, 274 may be latchably coupled to the latching features. The side walls 272, 274 may be releasable from the latching features.

The cover 201 is configured to be coupled to the outer housing 202 after the other components are assembled in the cavity 206. The cover 201 is used to retain the components in the cavity 206. For example, the cover 201 may be used to retain the inner housing 204 and terminal assemblies 301 in the cavity 206. The cover 201 is used to retain the choke 400 and the choke positioner 500 in the cavity 206.

The cover 201 includes a cover plate 290 used to cover the upper opening of the outer housing 202. In an exemplary embodiment, the cover 201 includes an opening 292 to receive the busbars 106. However, the cover 201 may include a plurality of openings in alternative embodiments each configured to receive a corresponding busbar 106. The cover 201 may be removably coupled to the outer housing 202. For example, the cover 201 includes latches 294 extending from the cover plate 290 configured to be latchably coupled to the outer housing 202.

The choke 400 is configured to be received in the cavity 206 of the outer housing 202 in a loading direction (for example, vertically). The choke 400 is configured to surround the terminal assemblies 301 when received in the cavity 206. The choke 400 includes a choke body 402 surrounding an opening 404 passing through the choke 400. The choke body 402 may be manufactured from a ferrite material, such as a magnesium zinc alloy material or an iron nickel alloy material. The choke body 402 may be manufactured form a material having characteristics of high permeability of the magnetic core and/or high saturation level and/or low magnetic losses. In the illustrated embodiment, the choke 400 is oval or racetrack shaped having curved ends and flat or parallel sides. The choke 400 may have other shapes in alternative embodiments.

The choke 400 extends between a top 406 and a bottom 408. The opening 404 extends between the top 406 and the bottom 408. The opening 404 is open at the top 406 and is open at the bottom 408 to receive terminal assemblies 301 and the busbars 106, 108. The choke 400 includes a first side 410 and a second side 412 opposite the first side 410. The choke 400 includes a front 414 and a rear 416 extending between the sides 410, 412. Rounded corners may be provided between the sides 410, 412 and the front 414 and the rear 416. The front 414 and the rear 416 may be elongated and oriented parallel to each other. The choke 400 includes a side wall 418 between the top 406 and the bottom 408. The side wall 418 is outward facing. The side wall 418 is defined by the front 414, the rear 416, and the sides 410, 412.

The choke 400 includes an inner surface 420 and an outer surface 422. The inner surface 420 surrounds and defines the opening 404. The inner surface 420 is configured to face the inner housing 204. The outer surface 422 faces outward. The outer surface 422 is configured to face the outer wall 210 of the outer housing 202.

In an exemplary embodiment, the choke 400 includes locating ribs 430 extending from the front 414 and/or the rear 416. The locating ribs 430 protrude from the choke 400. The locating ribs 430 are located along the outer surface 422 in the illustrated embodiment. However, the locating ribs 430 may extend along the inner surface 420 in alternative embodiments. The locating ribs 430 are used for positioning the choke 400 within the cavity 206. The locating ribs 430 interface with the choke positioner 500 to position the choke 400 relative to the outer housing 202. In other embodiments, the locating ribs 430 may additionally or alternatively be provided along the first side 410 and/or the second side 412. Other types of locating features may be used in alternative embodiments. For example, the locating features may be channels or slots rather than protrusions in alternative embodiments. In other various embodiments, the locating features may be deflectable beams, such as spring beams in alternative embodiments.

The choke positioner 500 is configured to interface with the choke 400 to position the choke 400 relative to the terminal assemblies 301. In an exemplary embodiment, multiple choke positioners 500 are provided for positioning the choke 400 in different directions. For example, the header power connector 100 may include at least one horizontal choke positioners 510 and at least one vertical choke positioners 520. The vertical choke positioners 520 position the choke in a direction parallel to the loading direction. The horizontal choke positioners 510 position the choke 400 in a lateral direction perpendicular to the loading direction.

The horizontal choke positioners 510 position the choke 400 in a horizontal direction, such as side-to-side and/or front-to-rear. In the illustrated embodiment, the horizontal choke positioners 502 include channels 512 in the outer housing 202. The channels 512 extend along an inner surface of the outer wall 210. The channels 512 are open to the cavity 206. The channels 512 receive the locating ribs 430. The channels 512 may be located along the front 224 and/or the rear 226. The channels 512 may be located along the first side 220 and/or the second side 222. Other types of horizontal choke positioners 510 may be used in alternative embodiments. The horizontal choke positioners 510 may include ribs or protrusions extending from the outer wall 210, which are configured to be received in pockets or slots in the choke 400. The horizontal choke positioners 510 may additionally or alternatively be provided on the terminal holder 203 and/or the terminal assembly retainer 205. The horizontal choke positioners 510 may include biasing elements, such as spring fingers to engage and position the choke 400. The horizontal choke positioners 510 may include compressible gaskets or sleeves configured to engage the choke 400.

The vertical choke positioner 520 positions the choke 400 vertically, such as top-to-bottom. In the illustrated embodiment, the vertical choke positioner 520 includes a compression ring 522. The compression ring 522 is configured to be coupled to the top 406 and/or the bottom 408. The compression ring 522 may be received in the outer housing 202, such as at the bottom of the cavity 206 and the choke 400 may rest on the compression ring 522. The compression ring 522 may be loaded into the cavity 206 after the choke 400 and fill the space between the choke 400 and the cover 201. The compression ring 522 includes an opening 524 therethrough to receive the busbars 106 or 108. The compression ring 522 is compressible, such as being compressible between the choke 400 and the header housing assembly 200. The compression ring 522 absorbs movement of the choke 400 in the cavity 206. The compression ring 522 restricts or limits movement of the choke 400 in a vertical direction, such as due to vibration or shock of the header power connector 100 during use, such as when the electric vehicle is driven. Other types of vertical choke positioners 504 may be used in alternative embodiments, such as locating ribs, clips, latches, or other locating features.

In the illustrated embodiment, a plurality of the terminal assemblies 301 are provided. Each terminal assembly 301 includes a plurality of terminals 300 stacked together in a terminal stack. The terminals 300 are arranged side-by-side in the terminal stack. The terminals 300 function as a single terminal assembly within the terminal stack. However, the terminals 300 are independently movable relative to each other and relative to the inner housing 204. The terminals 300 may be stamped and formed from thin metal sheets, but stacked together to increase the overall current carrying capacity of the terminal assembly. The terminal stacks are configured to be received in the outer housing 202, such as in the corresponding terminal channel, and are held in the outer housing 202 by the terminal assembly retainer 205. The inner housing 204 holds the terminals 300 from below, from the sides, from the front, and from the rear, while the terminal assembly retainer 205 holds the terminals 300 from above enclosing the terminal channels 256. The choke 400 surrounds the terminal stacks, such as being located in the cavity 206 between the inner housing 204 and the outer housing 202.

Figure 4:
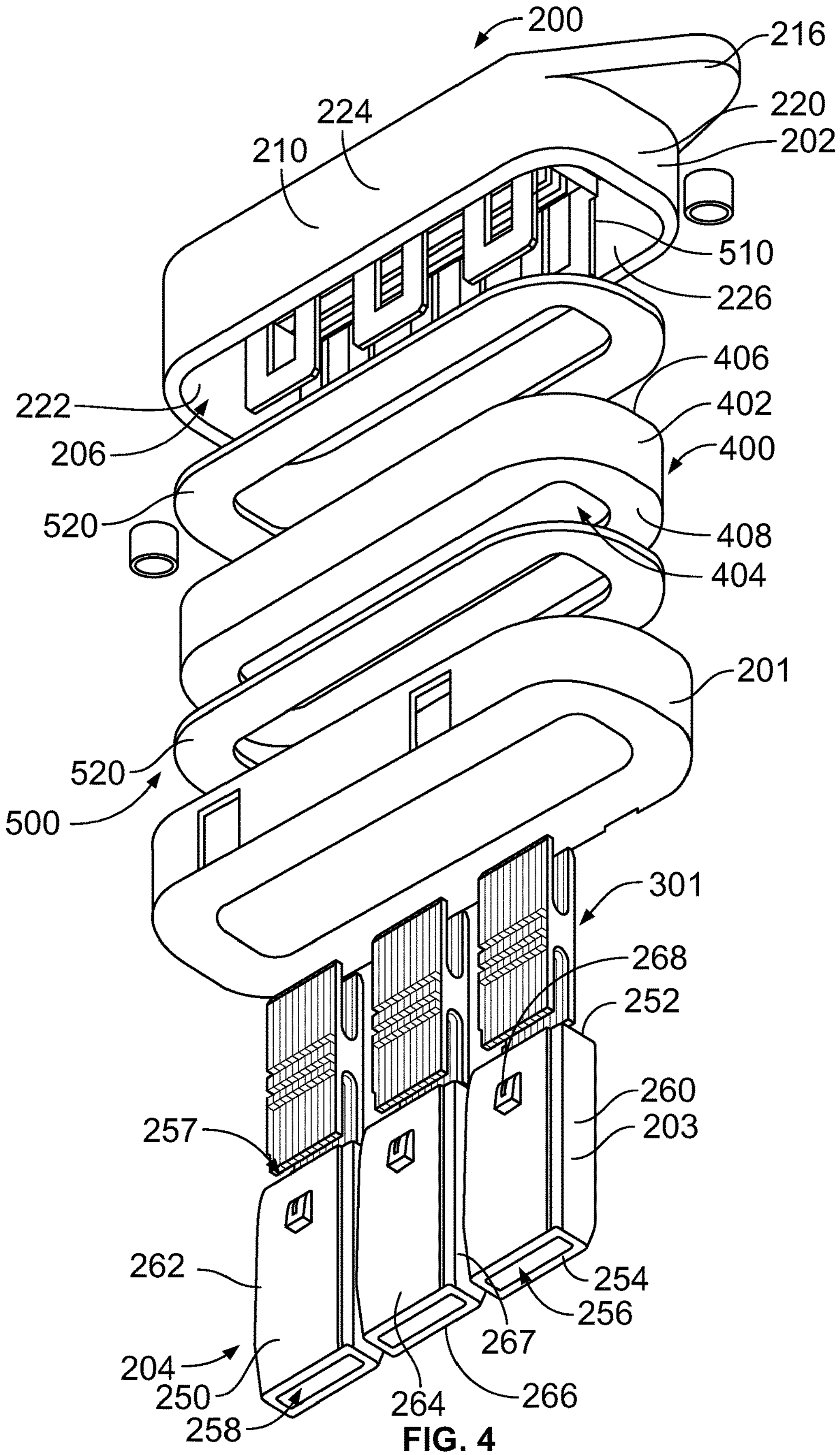
FIG. 4 is an exploded view of a header power connector in accordance with an exemplary embodiment.

FIG. 4 is an exploded view of the header power connector 100 in accordance with an exemplary embodiment. The header power connector 100 shown in FIG. 4 is similar to the header power connector 100 shown in FIG. 3 but includes different holding structures for holding the terminal assemblies 301. For example, the inner housing 204 is shaped differently and/or includes different components. The header power connector 100 includes the header housing assembly 200, the terminal assemblies 301 held by the header housing assembly 200, the choke 400 held by the header housing assembly 200, and the choke positioner 500 for positioning the choke 400 in the header housing assembly 200. The choke 400 surrounds the terminal assemblies 301 to cancel EMI for high frequency electronic noise suppression for the terminal assemblies 301. The choke 400 improves operation of the header power connector 100.

In an exemplary embodiment, the header housing assembly 200 includes the outer housing 202, the inner housing 204, and the cover 201 coupled to the outer housing 202 to hold the other components in the outer housing 202. In an exemplary embodiment, the inner housing 204 includes a terminal holder 203. The header housing assembly 200 may include greater or fewer parts in alternative embodiments. Additionally, while the parts are shown as separate, discrete components in the illustrated embodiment, various parts may be integrated into integral structures in alternative embodiments. For example, the terminal holder 203 may be an integral, unitary structure with the outer housing 202 in alternative embodiments.

The outer housing 202 includes the outer wall 210 surrounding the cavity 206. The outer housing 202 includes the mounting flanges 216 at the opposite sides 220, 222 of the outer housing 202 to secure the outer housing 202 to the first electrical component 102. The cavity 206 is formed between the front 224 and the rear 226 of the outer housing 202 and between the first side 220 and the second side 222 of the outer housing 202. The cavity 206 is open to receive the inner housing 204, the terminal assemblies 301, the choke 400 and the choke positioner 500.

The outer housing 202 may include latching features (not shown) used to secure the inner housing 204 to the outer housing 202. The latching features may be deflectable latching tabs configured to engage corresponding latching features of the inner housing 204. The latching features may be releasable to release the inner housing 204 from the outer housing 202.

The terminal holder 203 of the inner housing 204 includes a plurality of inner walls 250 extending between an upper end 252 and a lower end 254. The inner walls 250 form terminal channels 256 configured to receive corresponding terminal assemblies 301 therein. The terminal channels 256 are open at the upper end 252 and the lower end 254 to receive the busbars 106, 108, respectively. For example, the terminal holder 203 includes upper openings 257 that receive the first busbars 106 and lower openings 258 that receive the second busbars 108. The inner walls 250 guide the busbars 106, 108 into the terminal channels 256 to mate with the terminal assemblies 301. Optionally, the upper openings 257 and/or the lower openings 258 may include chamfered lead-in surfaces that guide the busbars 106, 108 into the terminal channels 256.

The terminal holder 203 of the inner housing 204 includes a first side 260 and a second side 262 opposite the first side 260. The terminal holder 203 of the inner housing 204 includes a front 264 and a rear 266 extending between the sides 260, 262. In an exemplary embodiment, the terminal holder 203 of the inner housing 204 includes positioning ribs 267 extending from the front 264 and/or the rear 266. The positioning ribs 267 are configured to position the inner housing 204 relative to the outer housing 202.

In an exemplary embodiment, the terminal holder 203 of the inner housing 204 includes latching features 268 extending from the front 264 and/or the rear 266. The latching features 268 are configured to interface with the outer housing 202 to secure the terminal holder 203 in the cavity 206 of the outer housing 202. In the illustrated embodiment, the latching features 268 include latches each having a ramp surface at the top of the latch and a catch surface at the bottom of the latch. Other types of latching features may be provided in alternative embodiments.

The cover 201 is configured to be coupled to the outer housing 202 after the other components are assembled in the cavity 206. The cover 201 is used to retain the components in the cavity 206. For example, the cover 201 may be used to retain the inner housing 204 and terminal assemblies 301 in the cavity 206. The cover 201 is used to retain the choke 400 and the choke positioner 500 in the cavity 206.

The choke 400 is configured to be received in the cavity 206 of the outer housing 202 in a loading direction (for example, vertically). The choke 400 is configured to surround the terminal assemblies 301 when received in the cavity 206. The choke 400 includes the choke body 402 surrounding the opening 404, which is open at the top 406 and is open at the bottom 408 to receive terminal assemblies 301 and the busbars 106, 108.

The choke positioner 500 is configured to interface with the choke 400 to position the choke 400 relative to the terminal assemblies 301. In an exemplary embodiment, multiple choke positioners 500 are provided for positioning the choke 400 in different directions. For example, the header power connector 100 may include at least one horizontal choke positioners 510 and at least one vertical choke positioners 520. The vertical choke positioners 520 may be compressible gaskets stacked above and below the choke 400. The vertical choke positioners 520 position the choke in a direction parallel to the loading direction. The horizontal choke positioners 510 are positioning tabs located within the cavity of the outer housing 202 in the illustrated embodiment. The horizontal choke positioners 510 position the choke 400 in a lateral direction perpendicular to the loading direction.

Figure 5:
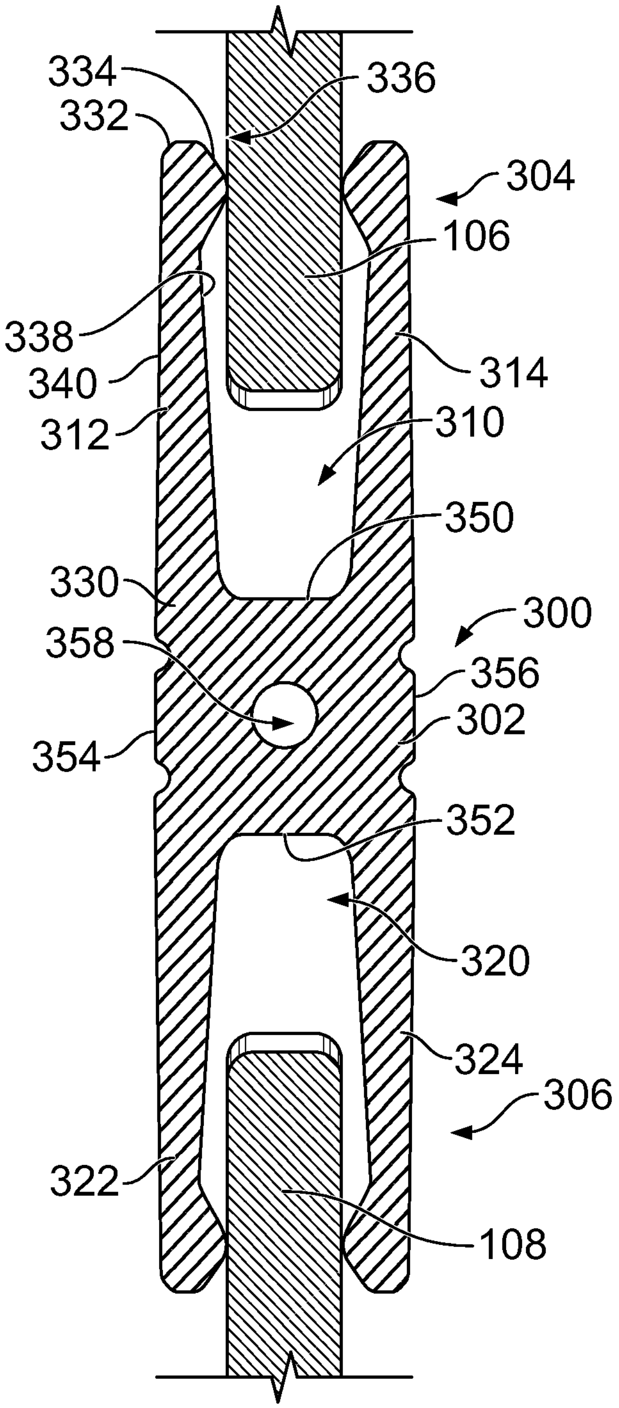
FIG. 5 is a side view of one of the terminals in accordance with an exemplary embodiment.

FIG. 5 is a side view of one of the terminals 300 in accordance with an exemplary embodiment. The terminal 300 is a double ended socket terminal configured to receive the first and second busbars 106, 108 in opposite ends of the terminal 300. Other types of terminals may be used in alternative embodiments.

The terminal 300 is a stamped and formed terminal manufactured from a metal material, such as a copper material. The terminal 300 may have one or more plating layers, such as a nickel plating layer and/or a gold plating layer. The terminal 300 includes a terminal base 302, an upper mating end 304 at a first side of the terminal base 302, and a lower mating end 306 at a second side of the terminal base 302. Optionally, the upper mating end 304 and the lower mating end 306 may be identical.

The terminal 300 has an upper socket 310 at the upper mating end 304. The terminal 300 includes a first upper spring beam 312 extending along the first side of the upper socket 310 and a second upper spring beam 314 extending along the second side of the upper socket 310.

The terminal includes a lower socket 320 at the lower mating end 306. The terminal 300 includes a first lower spring beam 322 extending along the first side of the lower socket 320 and a second lower spring beam 324 extending along the second side of the lower socket 310.

In an exemplary embodiment, the spring beams 312, 314, 322, 324 may be identical to one another. The spring beams 312, 314, 322, 324 may be deflectable when mated to the corresponding busbars 106 or 108. For example, the spring beams 312, 314, 322, 324 may be deflected outward when mated to the busbar 106 or 108, thus creating an inward biasing force or spring force to maintain electrical contact between the spring beams 312, 314, 322, 324 and the busbars 106 or 108.

In an exemplary embodiment, each spring beam 312, 314, 322, 324 includes a base 330 and a tip 332 at the distal end of the spring beam. The base 330 extends from the terminal base 302. Optionally, the spring beam 312, 314, 322, 324 may be widest at the base 330. In an exemplary embodiment, the spring beam 312, 314, 322, 324 narrows from the base 330 toward the tip 332. In an exemplary embodiment, the spring beam includes a bulge 334 near the tip 332. Optionally, the bulge 334 may be bulged inward. The bulge 334 has a curved surface defining a mating interface 336 configured to be mated with the corresponding busbar 106 or 108. The spring beam 312, 314, 322, 324 includes an inner surface 338 and an outer surface 340 opposite the inner surface 338. In various embodiments, the inner surface 338 and the outer surface 340 are tapered inward from the base 330 toward the tip 332. Optionally, the inner surface 338 may be tapered inward at a greater angle than the outer surface 340.

The terminal base 302 is located generally at the central portion of the terminal 300, such as between the upper mating end 304 and the lower mating end 306. The terminal base 302 includes an upper end 350 and a lower end 352. The terminal base 302 includes a first side 354 and a second side 356. The upper spring beams 312, 314 extend from the upper end 350 at the first and second sides 354, 356, respectively. The lower spring beams 322, 324 extend from the lower end 352 at the first and second sides 354, 356, respectively. In an exemplary embodiment, the terminal base 302 includes an opening 358 therethrough. Optionally, the opening 358 may be approximately centered between the upper end 350 and the lower end 352 and may be approximately centered between the first side 354 and the second side 356. The opening 358 may receive a portion of the header housing assembly 200 to locate and or retain the terminal 300 in the header housing assembly 200. For example, an axle may extend through the opening 358. Optionally, the terminal 300 may be rotatable about the axle, such as to shift the relative positions of the upper mating end 304 and the lower mating end 306.

Figure 6:
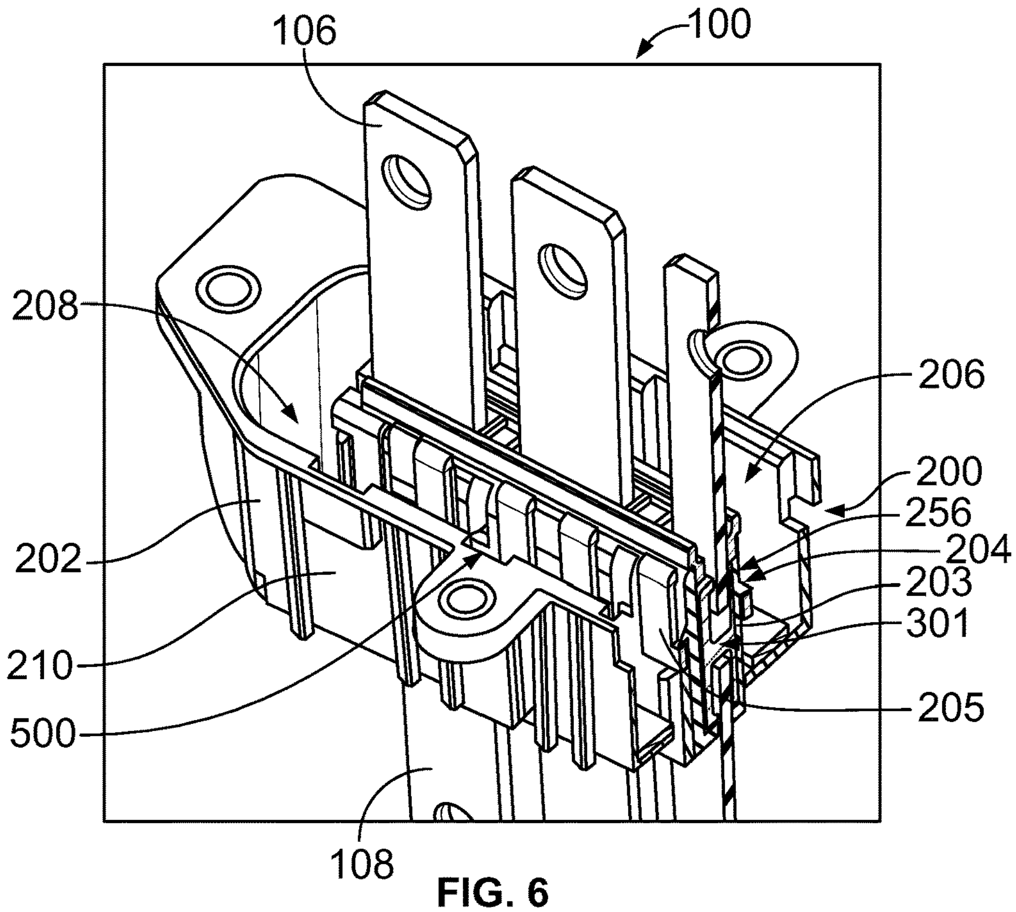
FIG. 6 is a top perspective, partial sectional view of a portion of the header power connector in accordance with an exemplary embodiment.
Figure 7:
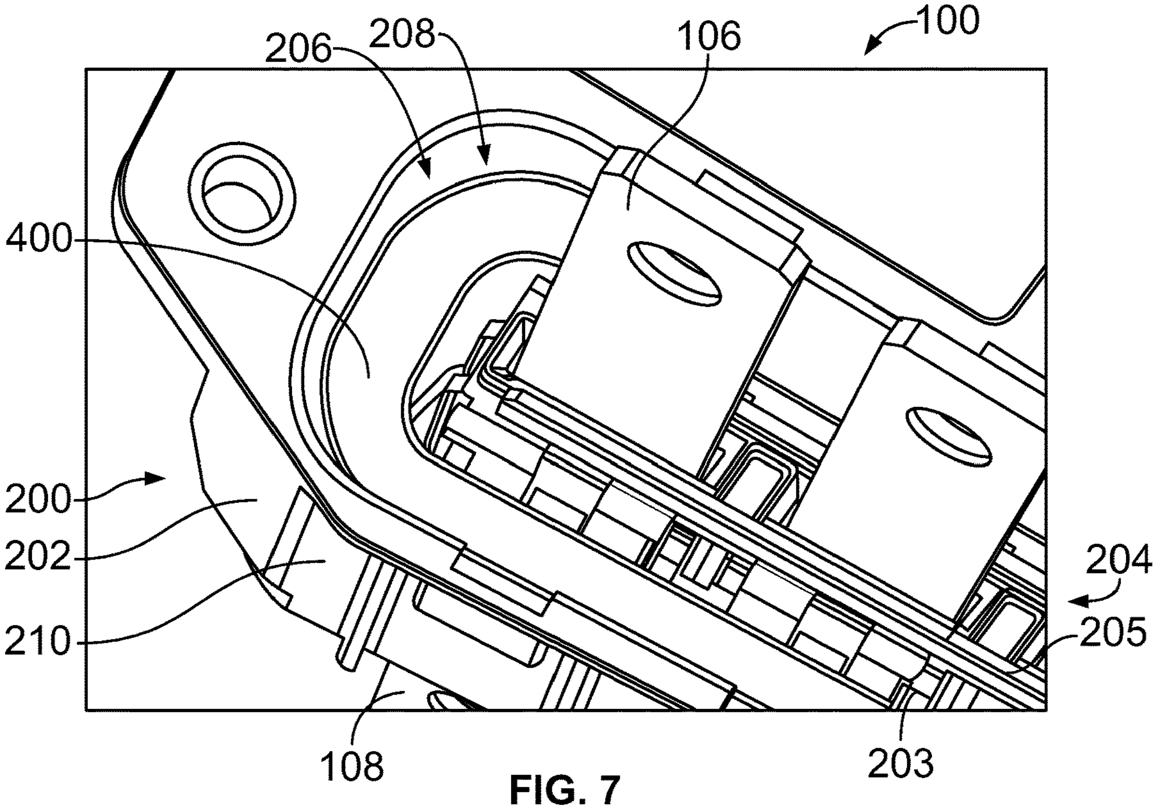
FIG. 7 is a top perspective, partial sectional view of a portion of the header power connector in accordance with an exemplary embodiment.

FIG. 6 is a top perspective, partial sectional view of a portion of the header power connector 100 in accordance with an exemplary embodiment. FIG. 7 is a top perspective, partial sectional view of a portion of the header power connector 100 in accordance with an exemplary embodiment. FIG. 6 shows the header power connector 100 without the choke 400. FIG. 7 shows the header power connector 100 with the choke 400 located in the cavity 206.

During assembly, the terminal assemblies 301 are loaded into the terminal holder 203 of the inner housing 204. The terminal assembly retainer 205 is coupled to the terminal holder 203 to retain the terminal assemblies 301 in the terminal channels 256. The terminal assemblies 301 are configured to be coupled to the busbars 106, 108.

In an exemplary embodiment, the cavity 206 includes a choke pocket 208 defined between the outer wall 210 and the inner housing 204. The choke pocket 208 is configured to receive the choke 400. The choke pocket 208 surrounds the inner housing 204 and the terminal assemblies 301. The choke 400 surrounds the terminal assemblies 301 when received in the choke pocket 208. In various embodiments, the choke pocket 208 may be oversized relative to the choke 400 to allow easy positioning of the choke 400 within the cavity 206. For example, because the choke 400 may have poor manufacturing tolerance, the choke pocket 208 is oversized to ensure that the choke 400 may fit within the choke pocket 208. The extra space or gaps may allow the choke 400 to have freedom of movement relative to the header housing assembly 200. However, the choke positioner(s) 500 are used to limit such freedom of movement of the choke 400 once positioned in the cavity 206. For example, the choke positioner(s) 500 may physically restrain the choke 400 and limit movement (for example, side-to-side and/or front-to-rear and/or top-to-bottom). FIG. 6 illustrates one of the vertical choke positioners 520 in the cavity 206, such as at the bottom of the choke pocket 208. The vertical choke positioner 520 may be compressible to occupy space between the choke 400 and the outer housing 202. The vertical choke positioner 520 may absorb vertical movement of the choke 400 within the cavity 206.

Figure 8:
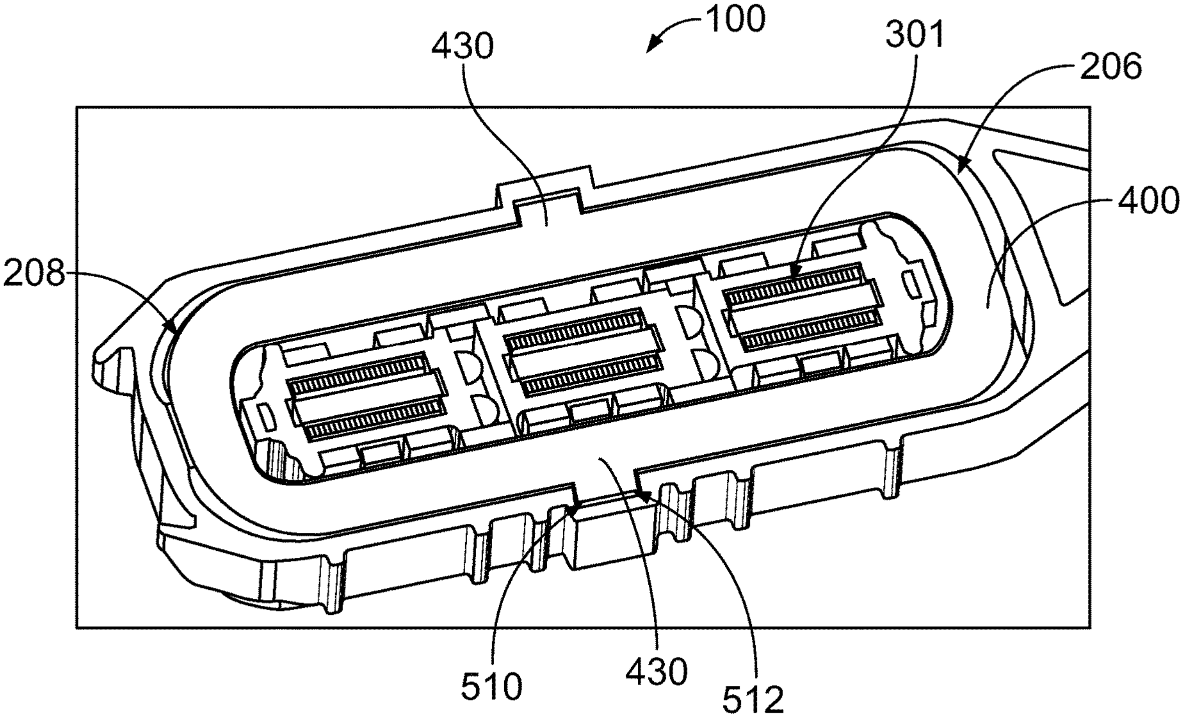
FIG. 8 is a top perspective view of a portion of the header power connector in accordance with an exemplary embodiment.
Figure 9:
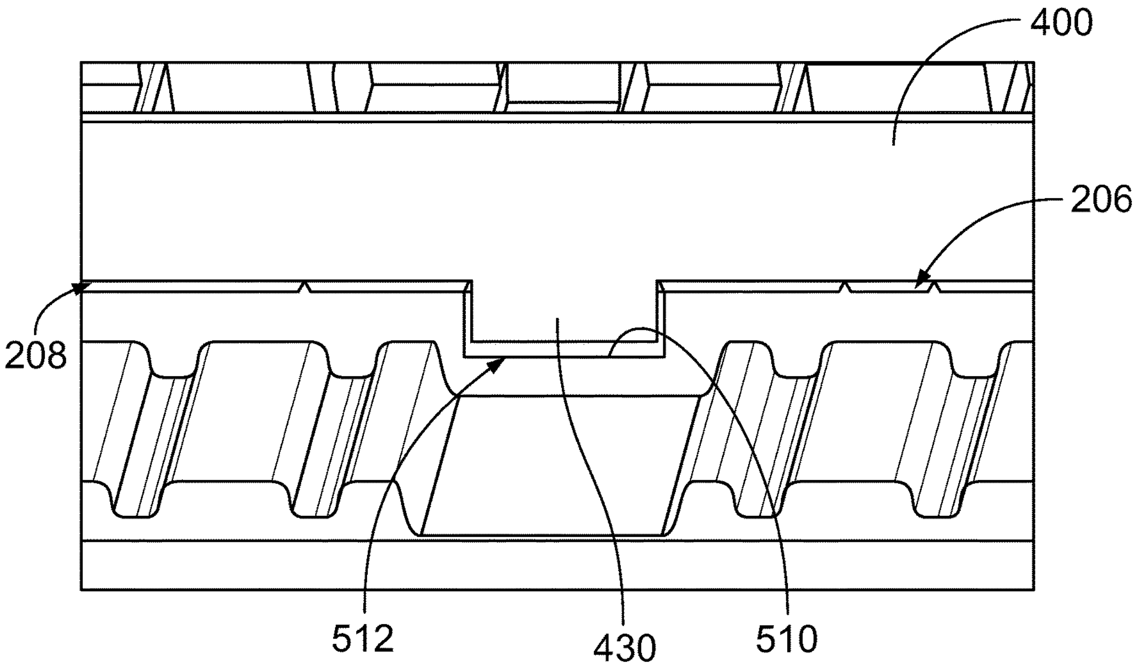
FIG. 9 is a top perspective enlarged view of a portion of the header power connector in accordance with an exemplary embodiment.

FIG. 8 is a top perspective view of a portion of the header power connector 100 in accordance with an exemplary embodiment. FIG. 9 is a top perspective enlarged view of a portion of the header power connector 100 in accordance with an exemplary embodiment. FIGS. 8 and 9 illustrate the header power connector 100 with the choke 400 located in the choke cavity 206. FIGS. 8 and 9 illustrate the choke 400 interfacing with the horizontal choke positioner 510 to position the choke 400 within the choke pocket 208. In the illustrated embodiment, the horizontal choke positioner 510 includes the channels 512 that receive the locating ribs 430. The walls of the channels 512 are used to position the choke 400 relative to the terminal assemblies 301. For example, the channels 512 may center the choke 400 in the choke pocket 208 and the walls of the channels 512 may limit or restrict side-to-side movement of the choke 400 within the choke pocket 208. Optionally, crush ribs or other features may be provided in the channels 512 to tightly hold the locating ribs 430 in the channels 512. Other types of horizontal choke positioners may be used in alternative embodiments.

Figure 10:
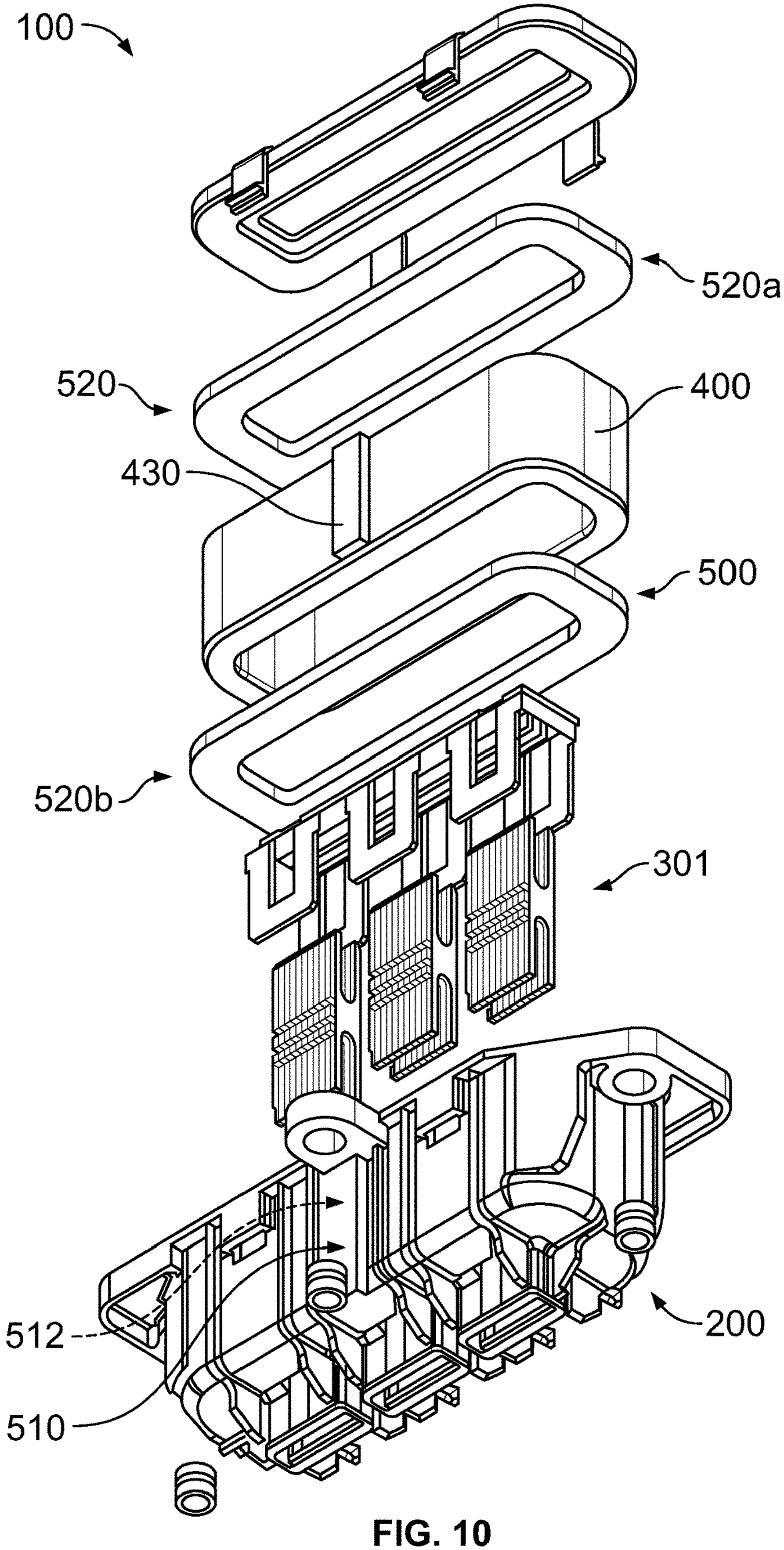
FIG. 10 is an exploded view of the header power connector in accordance with an exemplary embodiment.

FIG. 10 is an exploded view of the header power connector 100 in accordance with an exemplary embodiment. The header power connector 100 includes the header housing assembly 200, a plurality of the terminal assemblies 301 held by the header housing assembly 200, the choke 400 held by the header housing assembly 200, and the choke positioner 500 for positioning the choke 400 in the header housing assembly 200. In the illustrated embodiment, the choke positioner 500 includes a pair of the vertical choke positioners 520, such as upper and lower vertical choke positioners 520*a*, 520*b*. The choke 400 is configured to be sandwiched between the upper and lower vertical choke positioners 520*a*, 520*b*. The vertical choke positioners 520*a*, 520*b* are compressible and are configured to absorb vertical movements of the choke 400 within the header housing assembly 200, such as from vibrations. The horizontal choke positioners 510 are illustrated as channels 512 that receive the locating ribs 430 of the choke 400. Other types of horizontal choke positioners may be used in alternative embodiments.

Figure 11:
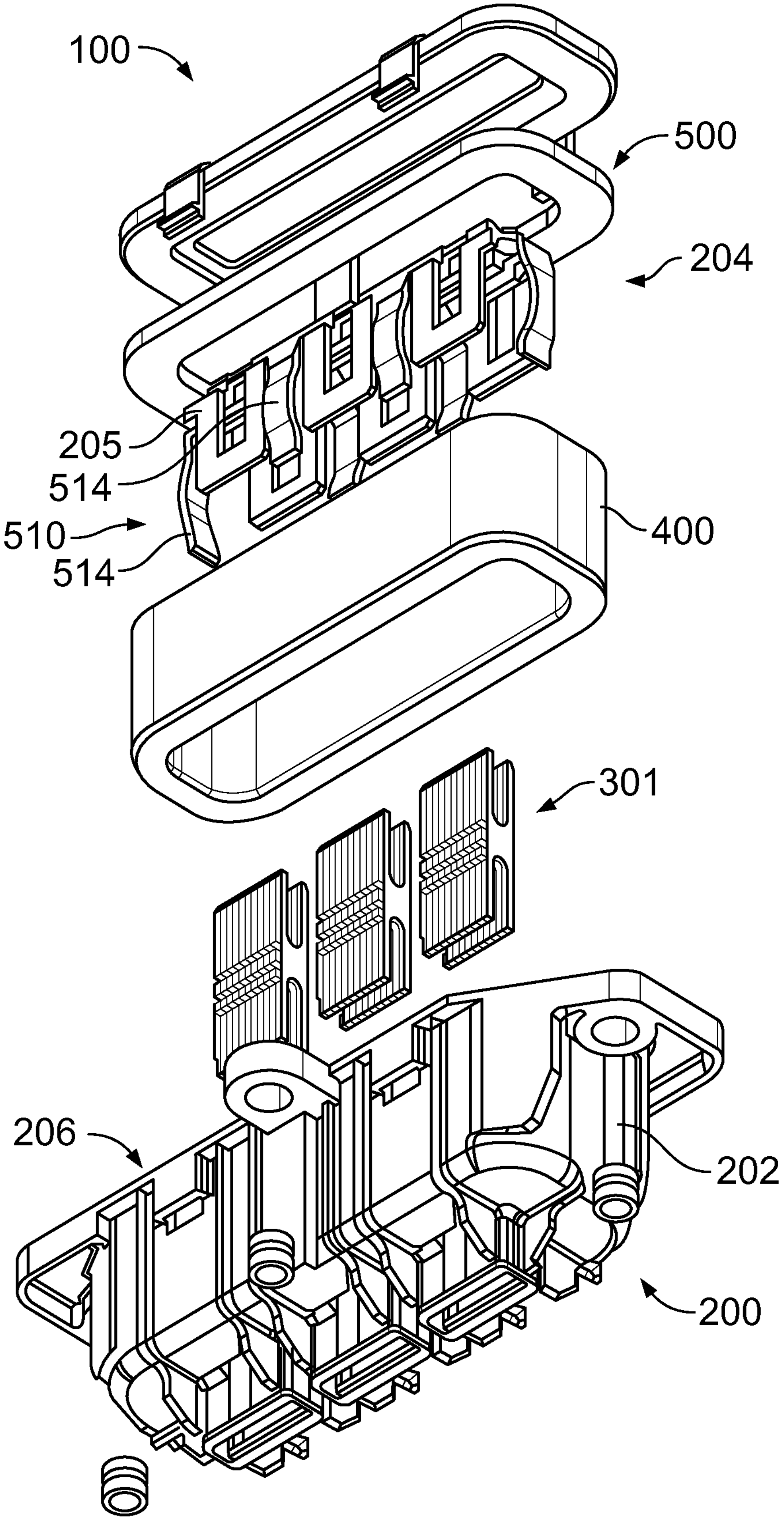
FIG. 11 is an exploded view of the header power connector in accordance with an exemplary embodiment.

FIG. 11 is an exploded view of the header power connector 100 in accordance with an exemplary embodiment. FIG. 11 illustrates a different type of choke positioner 500. For example, the choke 400 does not include the locating ribs 430 and the outer housing 202 does not include the channels. Rather, in the illustrated embodiment, the horizontal choke positioners 510 include spring beams 514 extending from the inner housing 204, such as from the terminal assembly retainer 205. The horizontal choke positioners 510 (for example, spring beams 514) interface with the choke 400 to position the choke 400 relative to the header housing assembly 200 and the terminal assemblies 301. The spring beams 514 are used to center the choke 400 within the cavity 206 of the outer housing 202. The spring beams 514 are flexible. The spring beams 514 are used to absorb movement of the choke 400, such as due to vibration. For example, the spring beams 514 restrict movement in a horizontal direction (for example, side-to-side and/or front-to-rear), which reduces risk of damage to the components of the header power connector 100.

Figure 12:
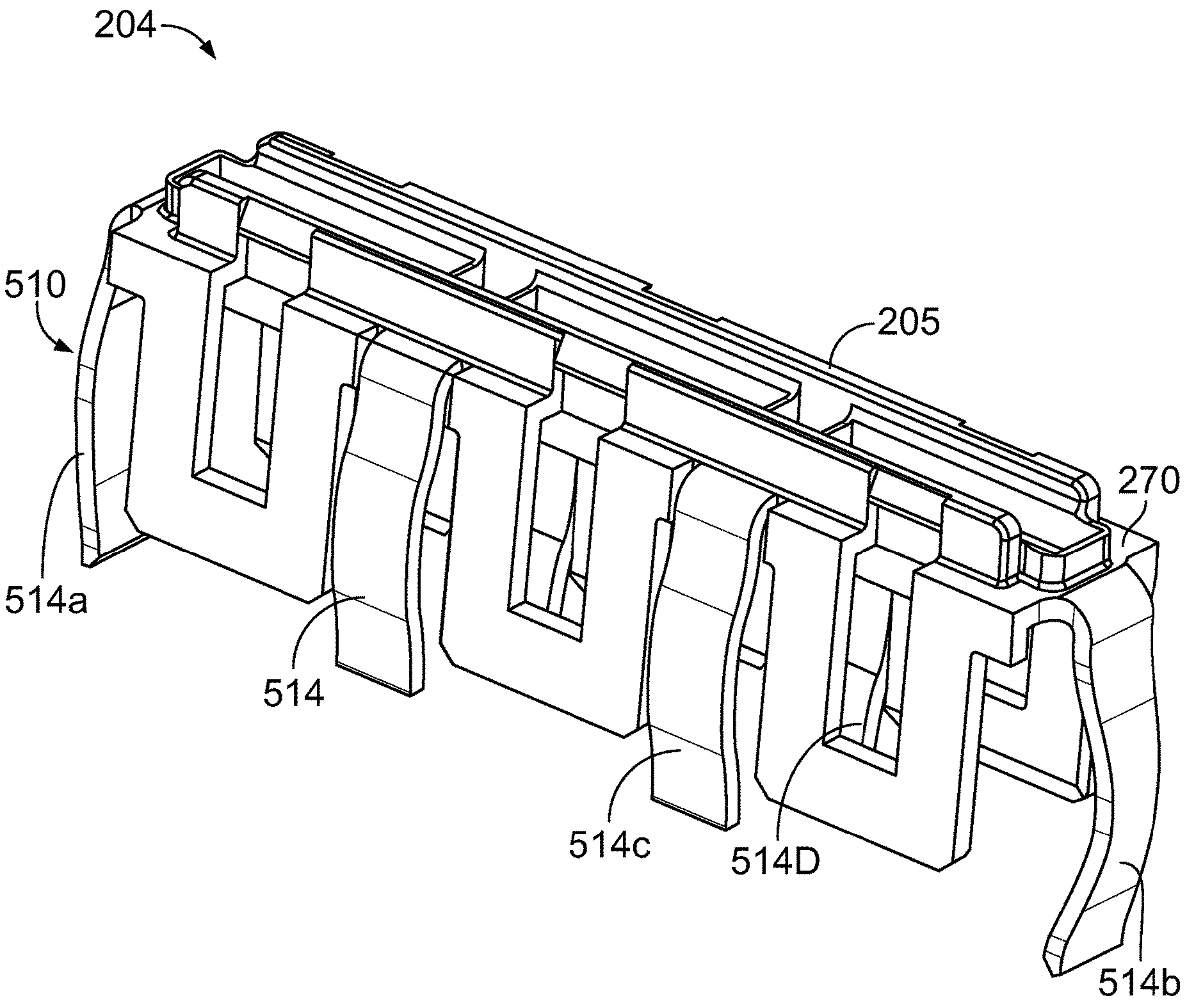
FIG. 12 is a perspective view of a portion of the inner housing showing the terminal assembly retainer in accordance with an exemplary embodiment.

FIG. 12 is a perspective view of a portion of the inner housing 204 showing the terminal assembly retainer 205 in accordance with an exemplary embodiment. The terminal assembly retainer 205 includes the spring beams 514, which define the horizontal choke positioners 510. The spring beams 514 extend from the end wall 270. The spring beams 514 have interfaces configured to engage the choke body 402 in the opening 404 of the choke 400. The spring beams 514 are flexible to absorb movement of the choke 400 relative to the inner housing 204 and the terminal assemblies 301.

In the illustrated embodiment, the spring beams 514 extend along the front and the rear of the terminal assembly retainer 205 to absorb front-to-rear movement of the choke 400 relative to the terminal assembly retainer 205. In an exemplary embodiment, the spring beams 514 are provided at both ends of the terminal assembly retainer 205 to absorb side-to-side movement of the choke 400 relative to the terminal assembly retainer 205. In an exemplary embodiment, the spring beams 514 include at least one first spring beam 514*a* at a first side of the terminal assembly retainer 205, at least one second spring beam 514*b* at a second side of the terminal assembly retainer 205, at least one front spring beam 514*c* at a front of the terminal assembly retainer 205, and at least one rear spring beam 514*d* at a rear of the terminal assembly retainer 205. The first and second spring beams 514*a*, 514*b* control side-to-side positioning of the choke 400 relative to the terminal assembly retainer 205. The front and rear spring beams 514*c*, 514*d* control front-to-rear positioning of the choke 400 relative to the terminal assembly retainer 205.

The spring beams 514 are curved in the illustrated embodiment and may be elastically deformed (for example, flattened) when engaging the choke 400. The spring beams 514 are configured to press outward against the choke 400 to position (for example, center or return to a nominal position) the choke 400 relative to the terminal assembly retainer 205.

Figure 13:
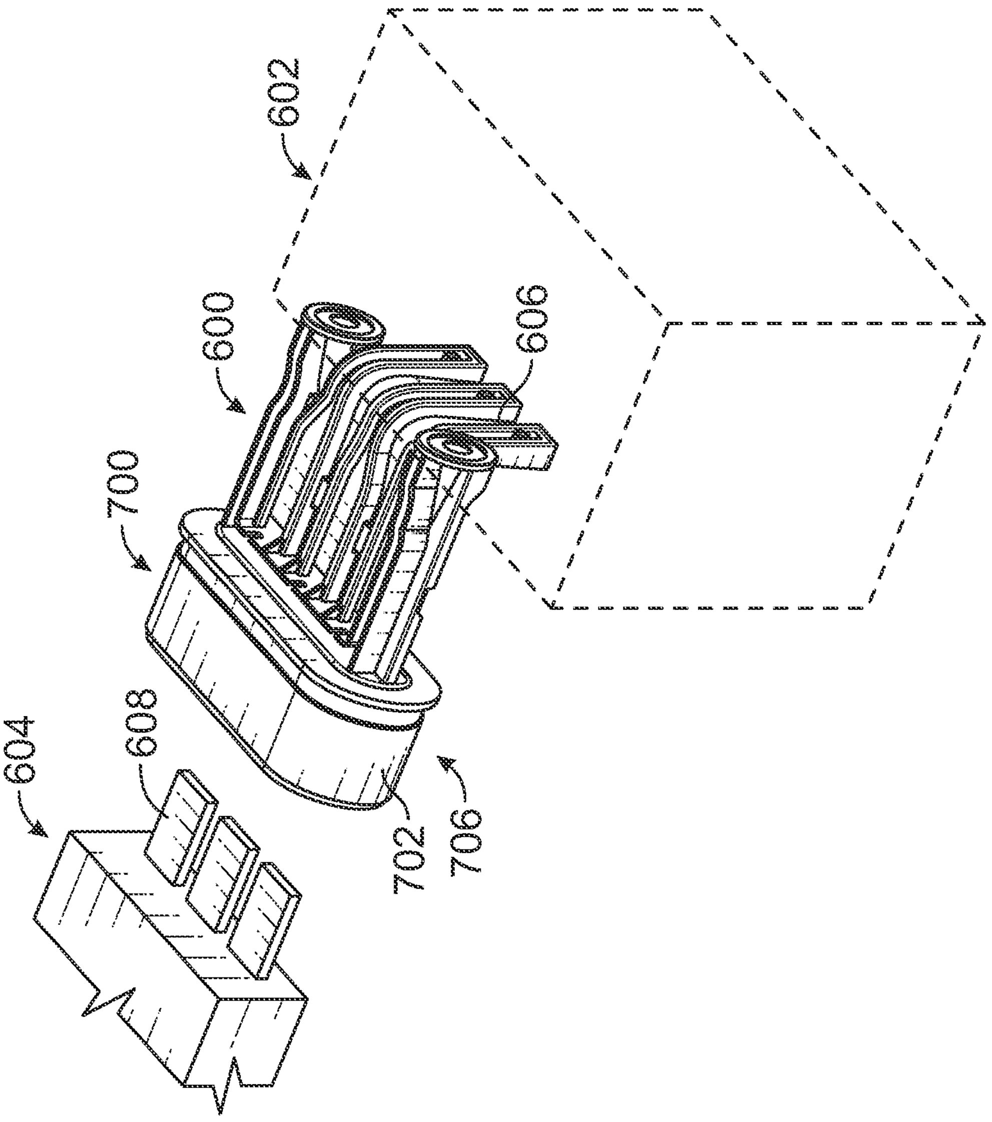
FIG. 13 is a schematic view of a header power connector in accordance with an exemplary embodiment.

FIG. 13 is a schematic view of a header power connector 600 in accordance with an exemplary embodiment. The header power connector 600 is used to electrically connect a first electrical component 602 and a second electrical component 604. In various embodiments, the first and second electrical components 602, 604 may be part of an electric vehicle. For example, the first electrical component 602 may be an inverter and the second electrical component 604 may be an electric motor. The header power connector 600 may be used to electrically connect other types of electrical components in alternative embodiments. In an exemplary embodiment, the header power connector 600 is mounted to the first electrical component 602 and mated with the second electrical component 604 when the first electrical component 602 is coupled to the second electrical component 604.

In an exemplary embodiment, the first electrical component 602 includes a first busbar 606 and the second electrical component 604 includes a second busbar 608. The first and second busbars 606, 608 are configured to be plugged directly into opposite ends of the header power connector 600. The header power connector 600 electrically connects the first and second busbars 606, 608 to transmit power between the first and second electrical components 602, 604.

In an exemplary embodiment, the header power connector 600 is used to electrically connect a plurality of the first busbars 606 (for example, three busbars) with a corresponding plurality of the second busbars 608 (for example, three busbars). The first busbars 606 are metal plates, such as copper plates. The second busbars 608 are metal plates, such as copper plates.

The header power connector 600 is located between the first electrical component 602 and the second electrical component 604. The busbars 606 of the first electrical component 602 are configured to be plugged directly into the header power connector 600. The busbars 608 of the second electrical component 604 are configured to be plugged directly into the header power connector 600, such as an opposite end of the header power connector 600. Optionally, the header power connector 600 may be initially mounted to the first electrical component 602 (or the second electrical component 604) and mated to the second electrical component 604 (or the first electrical component 602) when the first electrical component 602 is mounted to the second electrical component 604.

Figure 14:
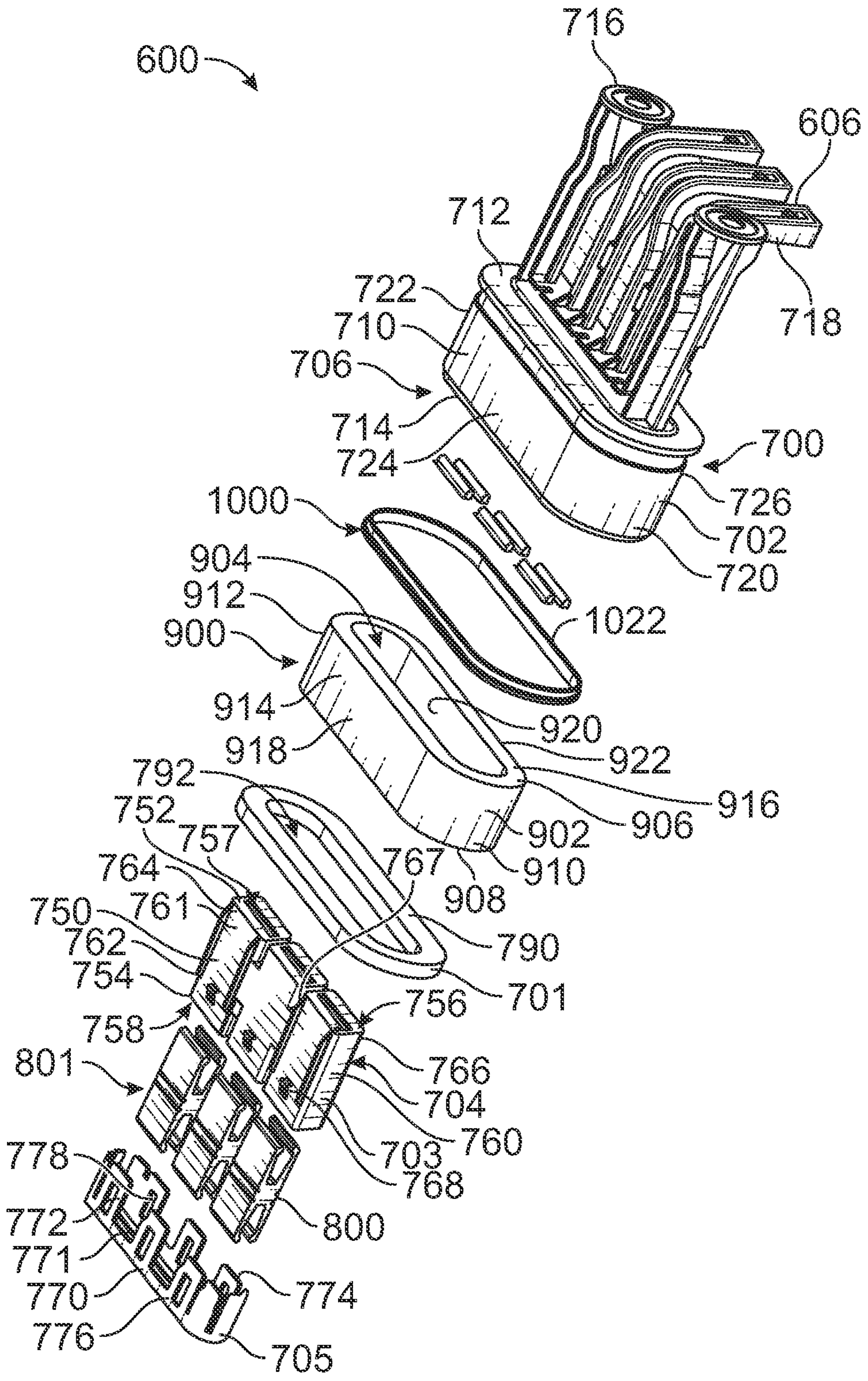
FIG. 14 is an exploded view of the header power connector in accordance with an exemplary embodiment.

The header power connector 600 includes a header housing assembly 700 and one or more terminal assemblies held by the header housing assembly 700. In an exemplary embodiment, the header housing assembly 700 is a multipiece housing assembly. For example, the header housing assembly 700 includes an outer housing 702 and an inner housing 704 (FIG. 14). The inner housing 704 holds the terminal assemblies. The inner housing 704 is received in a cavity 706 of the outer housing 702. In an exemplary embodiment, the outer housing 702 is configured to be mounted to one of the electrical components, such as the first electrical component 602. In an exemplary embodiment, the inner housing 704 is movable relative to the outer housing 702 to accommodate alignment and mating with the first electrical component 602. For example, the inner housing 704 may be tilted or rotated within the outer housing 702 to accommodate misalignment of the first and second busbars 606, 608. The inner housing 704 has a limited amount of contained movement relative to the outer housing 702. The outer housing 702 is shaped to control and contain the movement of the inner housing 704 during mating. For example, the outer housing 702 may allow the inner housing 704 to rotate a predetermined amount to allow mating with the busbars 606 of the first electrical component 602 during mating therewith. In an exemplary embodiment, the terminals of the terminal assemblies also have a limited amount of contained movement relative to the inner housing 704 to accommodate the misalignment of the first and second busbars 606, 608 during mating.

FIG. 14 is an exploded view of the header power connector 600 in accordance with an exemplary embodiment. The header power connector 600 includes the header housing assembly 700, a plurality of the terminal assemblies 801 of terminals 800 held by the header housing assembly 700, a choke 900 held by the header housing assembly 700, and a choke positioner 1000 for positioning the choke 900 in the header housing assembly 700. The choke 900 surrounds the terminal assemblies 801 to cancel EMI for high frequency electronic noise suppression for the terminal assemblies 801. The choke 900 improves operation of the header power connector 600. The header housing assembly 700 holds the choke 900 relative to the terminal assemblies 801. For example, the header housing assembly 700 separates the choke 900 from the terminal assemblies 801 to physically isolate the choke 900 from the terminal assemblies 801, such as to reduce wear or damage to the terminal assemblies 801 from movement (for example, vibration) of the choke 900 within the electric vehicle. The header housing assembly 700 separates the choke 900 from the terminal assemblies 801 to allow movement of the terminal assemblies 801 within the header housing assembly 700, such as for alignment of the terminal assemblies 801 to the busbars 606, 608 (FIG. 13) during mating.

In an exemplary embodiment, the header housing assembly 700 includes the outer housing 702, the inner housing 704, and a cover 701 coupled to the outer housing 702 to hold the other components in the outer housing 702. In an exemplary embodiment, the inner housing 704 includes a terminal assembly retainer 705 configured to be coupled to the outer housing 702. The header housing assembly 700 may include greater or fewer parts in alternative embodiments. For example, the inner housing 704 may include a terminal holder, which may be located within the cavity 706 of the outer housing 702. Additionally, while the parts are shown as separate, discrete components in the illustrated embodiment, various parts may be integrated into integral structures in alternative embodiments.

Figure 20:
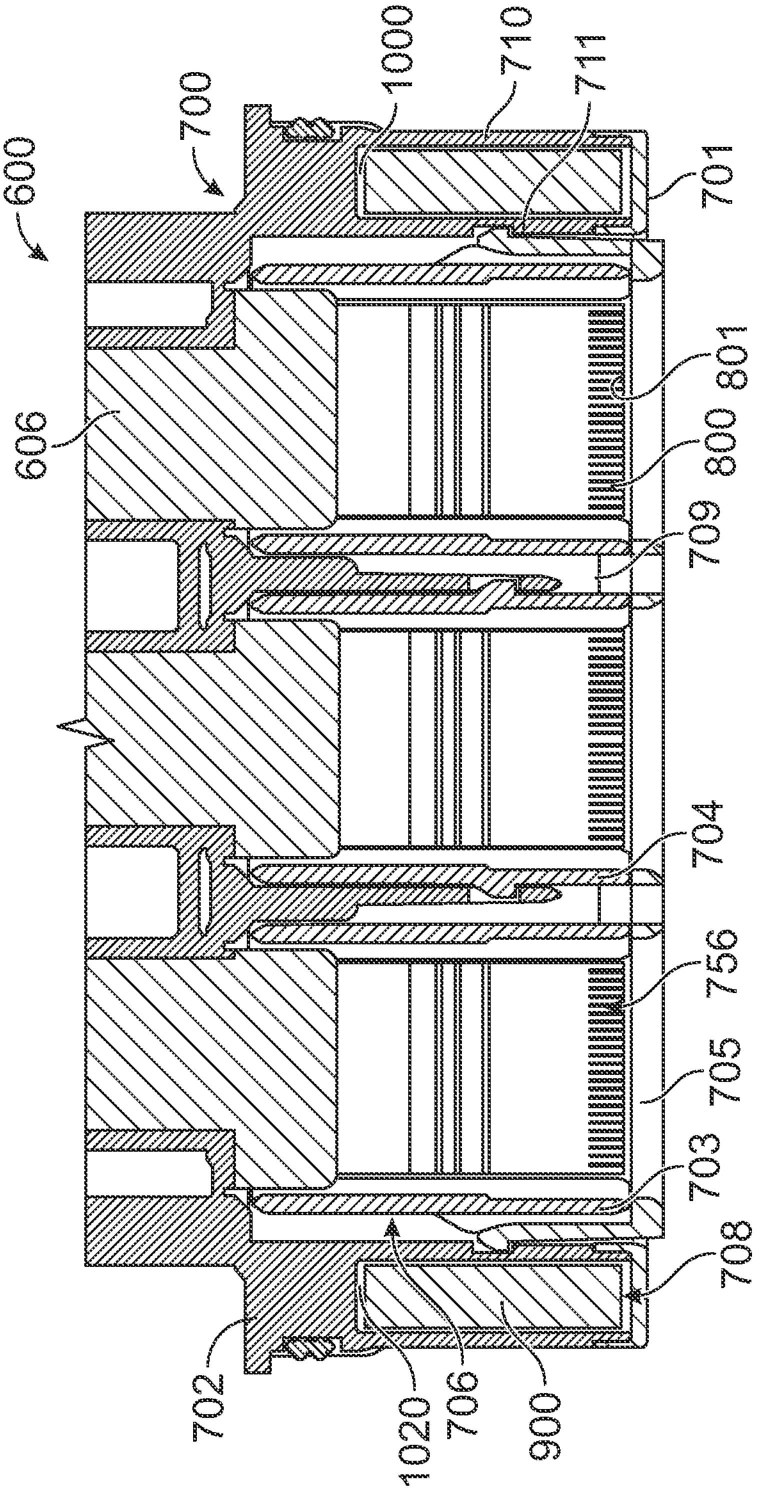
FIG. 20 is a side cross sectional view of the header power connector in accordance with an exemplary embodiment.

The outer housing 702 includes an outer wall 710 surrounding the cavity 706 and a separating wall 711 (shown in FIG. 20) in the cavity 706 surrounded by the outer wall 710. The separating wall 711 is used to separate the choke 900 from the terminal assemblies 801. In an exemplary embodiment, the separating wall 711 divides the cavity 706 into a choke chamber 708 (FIG. 20) and a terminal chamber 709 (FIG. 20). The choke chamber 708 is located between the separating wall 711 and the outer wall 710 and receives the choke 900. The terminal chamber 709 is located inside the separating wall 711.

The outer wall 710 extends between an upper end 712 and a lower end 714 of the outer housing 702. In an exemplary embodiment, the upper end 712 is configured to be mounted to the first electrical component 602 such that the header power connector 600 extends from the bottom of the first electrical component 602. Other mounting orientations are possible in alternative embodiments. For example, the header power connector 600 may be oriented such that the end 712 defines a bottom of the outer housing 702, such as when the outer housing 702 is mounted to the top of the structure, such as one of the electrical components. In other various embodiments, the outer housing 702 may be oriented such that neither of the ends 712, 714 are at the top or the bottom, but rather define sides of the outer housing 702.

The terms upper and lower are used herein in reference to the orientation illustrated in the figures.

The outer housing 702 includes mounting flanges 716 at opposite sides 720, 722 of the outer housing 702. The mounting flanges 716 may receive fasteners to secure the outer housing 702 to the first electrical component 602. For example, the fasteners may be threadably coupled to the mounting flanges 716 are threaded inserts held in the mounting flanges 716. The outer housing 702 may include busbar supports 718 to support the busbars 606. The busbar supports 718 may be right angle supports including vertical supports and horizontal supports. The busbar supports 718 may have other shapes in alternative embodiments.

The outer housing 702 includes a front 724 and a rear 726 extending between the sides 720, 722. The cavity 706 is formed between the front 724 and the rear 726. The cavity 706 extends between the first side 720 and the second side 722. The cavity 706 is open, such as at the bottom, to receive the inner housing 704, the terminal assemblies 801, the choke 900 and the choke positioner 1000.

The outer housing 702 may include latching features (not shown) used to secure the inner housing 704 to the outer housing 702. The latching features may be deflectable latching tabs configured to engage corresponding latching features of the inner housing 704. The latching features may be releasable to release the inner housing 704 from the outer housing 702.

In an exemplary embodiment, the inner housing 704 includes a terminal holder 703 for holding the terminals 800. The terminal assembly retainer 705 may be coupled to the terminal holder 703. The terminal holder 703 of the inner housing 704 includes a plurality of inner walls 750 extending between an upper end 752 and a lower end 754. The inner walls 750 form terminal channels 756 configured to receive corresponding terminal assemblies 801 therein. The terminal channels 756 are open at the upper end 752 and the lower end 754 to receive the busbars 606, 608, respectively. For example, the terminal holder 703 includes upper openings 757 that receive the first busbars 606 and lower openings 758 that receive the second busbars 608. The inner walls 750 guide the busbars 606, 608 into the terminal channels 756 to mate with the terminal assemblies 801. Optionally, the upper openings 757 and/or the lower openings 758 may include chamfered lead-in surfaces that guide the busbars 606, 608 into the terminal channels 756.

The terminal holder 703 of the inner housing 704 includes a first side 760 and a second side 762 opposite the first side 760. The terminal holder 703 of the inner housing 704 includes a front 764 and a rear 766 extending between the sides 760, 762. In an exemplary embodiment, the terminal holder 703 of the inner housing 704 includes positioning ribs 767 extending from the front 764 and/or the rear 766. The positioning ribs 767 are configured to position the inner housing 704 relative to the outer housing 702.

In an exemplary embodiment, the terminal holder 703 of the inner housing 704 includes latching features 768 extending from the front 764 and/or the rear 766. The latching features 768 are configured to interface with the outer housing 702 to secure the terminal holder 703 in the cavity 706 of the outer housing 702. For example, the latching features 768 may be coupled to the separating wall 711 to hold the terminal holder 703 in the terminal chamber 709. In the illustrated embodiment, the latching features 768 include latches each having a ramp surface at the top of the latch and a catch surface at the bottom of the latch. Other types of latching features may be provided in alternative embodiments.

The terminal assembly retainer 705 is coupled to the bottom of the terminal holder 703 to retain the terminals 800 in the terminal channels 756. The terminal assembly retainer 705 includes an end wall 770 and side walls 772, 774 extending from the end wall 770. The end wall 770 includes slots 771 configured to receive the busbars 606. The side walls 772, 774 include openings 776, 778 that receive latching features to secure the terminal assembly retainer 705 to the inner housing 704 and/or the outer housing 702. The side walls 772, 774 may be latchably coupled to the latching features. The side walls 772, 774 may be releasable from the latching features.

The cover 701 is configured to be coupled to the outer housing 702 after the other components are assembled in the cavity 706. The cover 701 is used to retain the components in the cavity 706. For example, the cover 701 is used to retain the choke 900 and the choke positioner 1000 in the cavity 706. The cover 701 may be used to retain the inner housing 704 and terminal assemblies 801 in the cavity 706. For example, the cover 701 may be coupled to the terminal assembly retainer 705 to retain the terminal assembly retainer 705 and the terminal holder 703 in the outer housing 702.

The cover 701 includes a cover plate 790 used to cover the bottom of the outer housing 702. In an exemplary embodiment, the cover 701 includes an opening 792 to receive the busbars 606 and/or the terminal assemblies 801. The cover 701 may be removably coupled to the outer housing 702. For example, the cover 701 may include latches extending from the cover plate 790 configured to be latchably coupled to the outer housing 702.

The choke 900 is configured to be received in the cavity 706, such as in the choke chamber 708, of the outer housing 702 in a loading direction (for example, vertically). The choke 900 may be coupled to the separating wall 711 (FIG. 20) and/or the outer wall 710. The choke 900 surrounds the separating wall 711. The choke 900 is configured to surround the terminal assemblies 801 when received in the cavity 706.

The choke 900 includes a choke body 902 surrounding an opening 904 passing through the choke 900. The choke body 902 may be manufactured from a ferrite material, such as a magnesium zinc alloy material or an iron nickel alloy material. However, other types of choke bodies may be used in alternative embodiments. The choke body 902 may be manufactured form a material having characteristics of high permeability of the magnetic core and/or high saturation level and/or low magnetic losses. In the illustrated embodiment, the choke 900 is oval or racetrack shaped having curved ends and flat or parallel sides. The choke 900 may have other shapes in alternative embodiments.

The choke 900 extends between a top 906 and a bottom 908. The opening 904 extends between the top 906 and the bottom 908. The opening 904 is open at the top 906 and is open at the bottom 908 to receive terminal assemblies 801 and the busbars 606, 608. The choke 900 includes a first side 910 and a second side 912 opposite the first side 910. The choke 900 includes a front 914 and a rear 916 extending between the sides 910, 912. Rounded corners may be provided between the sides 910, 912 and the front 914 and the rear 916. The front 914 and the rear 916 may be elongated and oriented parallel to each other. The choke 900 includes a side wall 918 between the top 906 and the bottom 908. The side wall 918 is outward facing. The side wall 918 is defined by the front 914, the rear 916, and the sides 910, 912.

The choke 900 includes an inner surface 920 and an outer surface 922. The inner surface 920 surrounds and defines the opening 904. The inner surface 920 is configured to face the separating wall 711. The outer surface 922 faces outward. The outer surface 922 is configured to face the outer wall 710 of the outer housing 702.

In an exemplary embodiment, the choke 900 includes locating features, such as locating ribs (not shown) extending from the front 914 and/or the rear 916. The locating ribs protrude from the choke 900. The locating ribs are located along the outer surface 922 in the illustrated embodiment. However, the locating ribs may extend along the inner surface 920 in alternative embodiments. The locating ribs are used for positioning the choke 900 within the cavity 706. The locating ribs interface with the choke positioner 1000 to position the choke 900 relative to the outer housing 702. In other embodiments, the locating ribs may additionally or alternatively be provided along the first side 910 and/or the second side 912. Other types of locating features may be used in alternative embodiments. For example, the locating features may be channels or slots rather than protrusions in alternative embodiments. In other various embodiments, the locating features may be deflectable beams, such as spring beams in alternative embodiments. Epoxy or adhesive may be used to position the choke 900 in the cavity.

The choke positioner 1000 is configured to interface with the choke 900 to position the choke 900 relative to the terminal assemblies 801. In an exemplary embodiment, multiple choke positioners 1000 are provided for positioning the choke 900 in different directions. For example, the header power connector 600 may include at least one horizontal choke positioners and at least one vertical choke positioners. The vertical choke positioners position the choke in a direction parallel to the loading direction. The vertical choke positioner positions the choke 900 vertically, such as top-to-bottom. The horizontal choke positioners position the choke 900 in a lateral direction perpendicular to the loading direction. The horizontal choke positioners position the choke 900 in a horizontal direction, such as side-to-side and/or front-to-rear.

In the illustrated embodiment, the choke positioner 1000 includes a compression ring 1022. The compression ring 1022 is configured to be coupled to the top 906 and/or the bottom 908. The compression ring 1022 may be received in the outer housing 702, such as at the bottom of the cavity 706 and the choke 900 may rest on the compression ring 1022. The choke 900 may be loaded into the cavity 706 after the compression ring 1022 and fill the space between the choke 900 and the outer housing 702. The compression ring 1022 is compressible, such as being compressible between the choke 900 and the header housing assembly 700. The compression ring 1022 absorbs movement of the choke 900 in the cavity 706. The compression ring 1022 restricts or limits movement of the choke 900, such as in a vertical direction, such as due to vibration or shock of the header power connector 600 during use, such as when the electric vehicle is driven. Other types of choke positioners 1000 may be used in alternative embodiments, such as locating ribs, clips, latches, epoxy, adhesive, or other locating features.

In the illustrated embodiment, a plurality of the terminal assemblies 801 are provided. Each terminal assembly 801 includes a plurality of terminals 800 stacked together in a terminal stack. The terminals 800 are arranged side-by-side in the terminal stack. The terminals 800 function as a single terminal assembly within the terminal stack. However, the terminals 800 are independently movable relative to each other and relative to the inner housing 704. The terminals 800 may be stamped and formed from thin metal sheets, but stacked together to increase the overall current carrying capacity of the terminal assembly. The choke 900 surrounds the terminal stacks, such as being located in the cavity 706 between the inner housing 704 and the outer housing 702.

Figure 15:
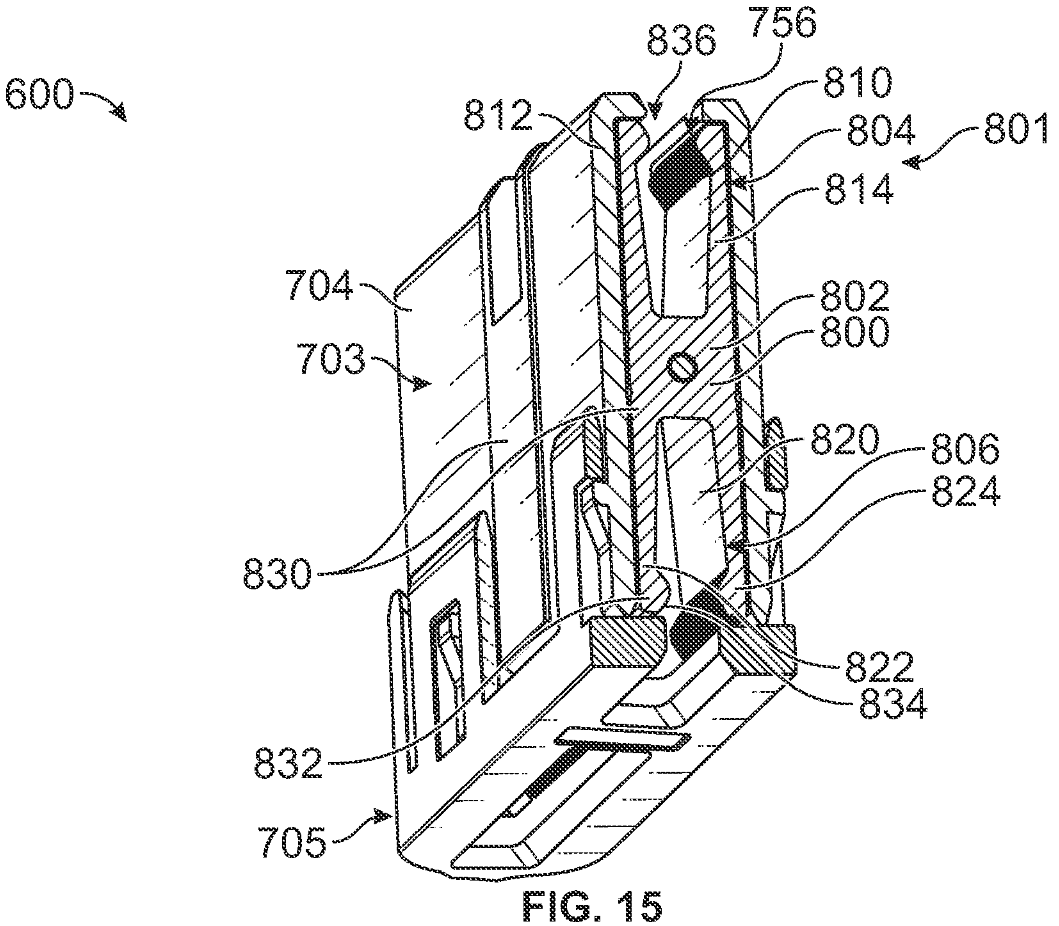
FIG. 15 is a sectional view of a portion of the header power connector showing the terminal assemblies in accordance with an exemplary embodiment.
Figure 16:
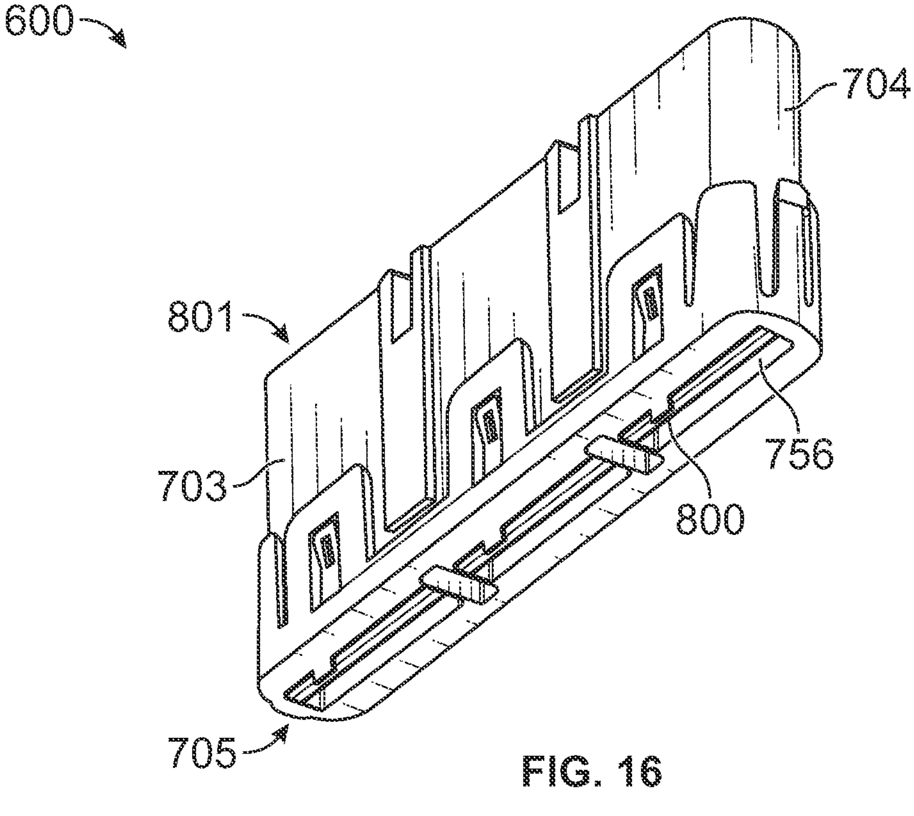
FIG. 16 is a bottom perspective view of a portion of the header power connector showing the terminal assemblies in accordance with an exemplary embodiment.

FIG. 15 is a sectional view of a portion of the header power connector 600 showing the terminal assemblies 801 in accordance with an exemplary embodiment. FIG. 16 is a bottom perspective view of a portion of the header power connector 600 showing the terminal assemblies 801 in accordance with an exemplary embodiment. FIGS. 15 and 16 illustrate the inner housing 704 holding the terminals 800 showing the terminals in the terminal channel 756 in the terminal holder 703 and the terminal assembly retainer 705 coupled to the terminal holder 703 to retain the terminals 800 in the terminal channel 756.

In an exemplary embodiment, the terminals 800 are similar to the terminals 300 shown in FIG. 5. With reference to FIG. 15, each terminal 800 is a double ended socket terminal configured to receive the first and second busbars 606, 608 in opposite ends of the terminal 800. Other types of terminals may be used in alternative embodiments. The terminal 800 is a stamped and formed terminal manufactured from a metal material, such as a copper material. The terminal 800 includes a terminal base 802, an upper mating end 804 at a first side of the terminal base 802, and a lower mating end 806 at a second side of the terminal base 802. Optionally, the upper mating end 804 and the lower mating end 806 may be identical.

The terminal 800 has an upper socket 810 at the upper mating end 804. The terminal 800 includes a first upper spring beam 812 extending along the first side of the upper socket 810 and a second upper spring beam 814 extending along the second side of the upper socket 810.

The terminal includes a lower socket 820 at the lower mating end 806. The terminal 800 includes a first lower spring beam 822 extending along the first side of the lower socket 820 and a second lower spring beam 824 extending along the second side of the lower socket 810.

In an exemplary embodiment, each spring beam 812, 814, 822, 824 includes a base 830 and a tip 832 at the distal end of the spring beam. The base 830 extends from the terminal base 802. In an exemplary embodiment, the spring beam includes a bulge 834 near the tip 832. Optionally, the bulge 834 may be bulged inward. The bulge 834 has a curved surface defining a mating interface 836 configured to be mated with the corresponding busbar 606 or 608.

Figure 17:
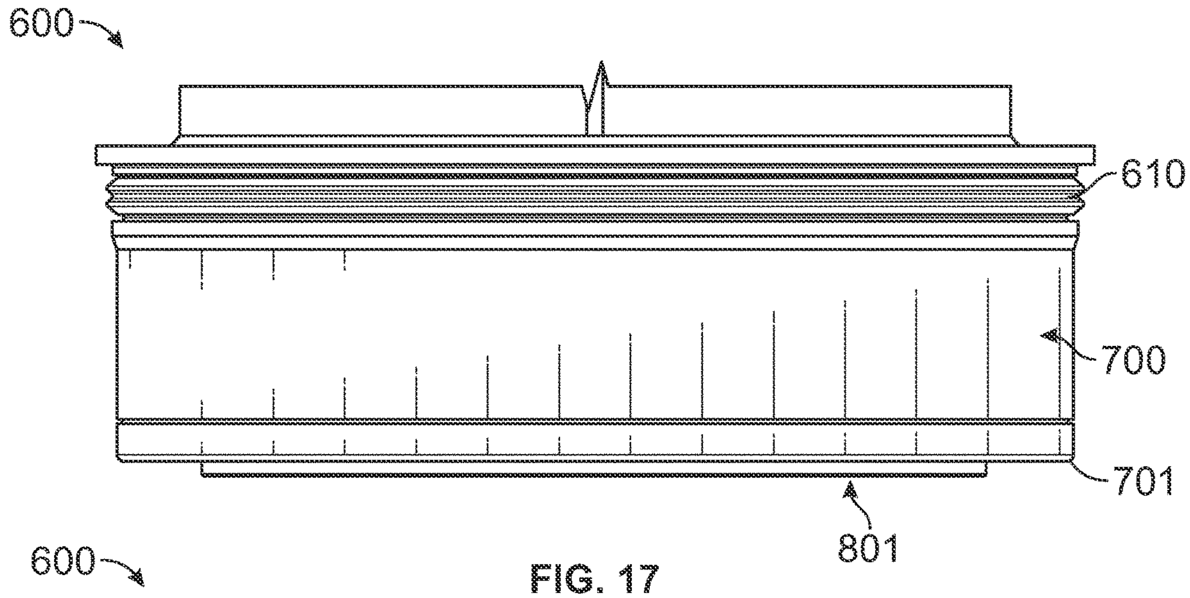
FIG. 17 is a front view of the header power connector in accordance with an exemplary embodiment.
Figure 18:
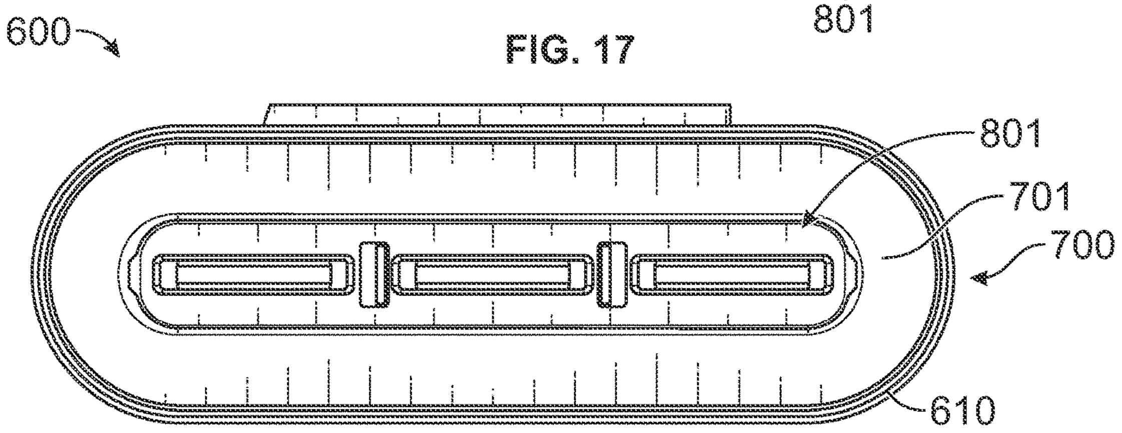
FIG. 18 is a bottom view of the header power connector in accordance with an exemplary embodiment.
Figure 19:
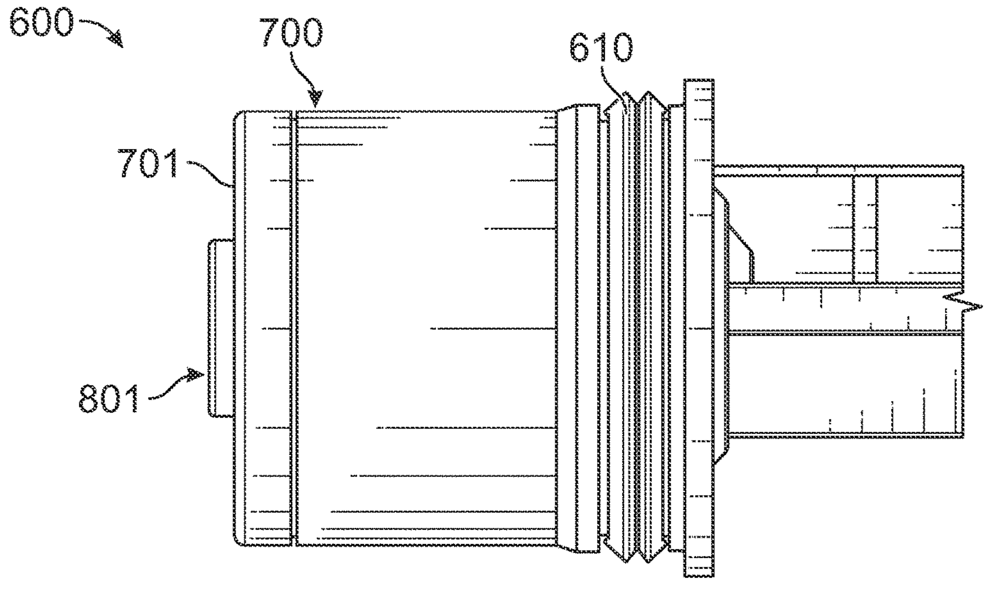
FIG. 19 is a side view of the header power connector in accordance with an exemplary embodiment.

FIG. 17 is a front view of the header power connector 600 in accordance with an exemplary embodiment. FIG. 18 is a bottom view of the header power connector 600 in accordance with an exemplary embodiment. FIG. 19 is a side view of the header power connector 600 in accordance with an exemplary embodiment. The terminal assemblies 801 are hold in the header housing assembly 700, such as by the cover 701. A seal 610 may surround the header housing assembly 700.

Figure 21:
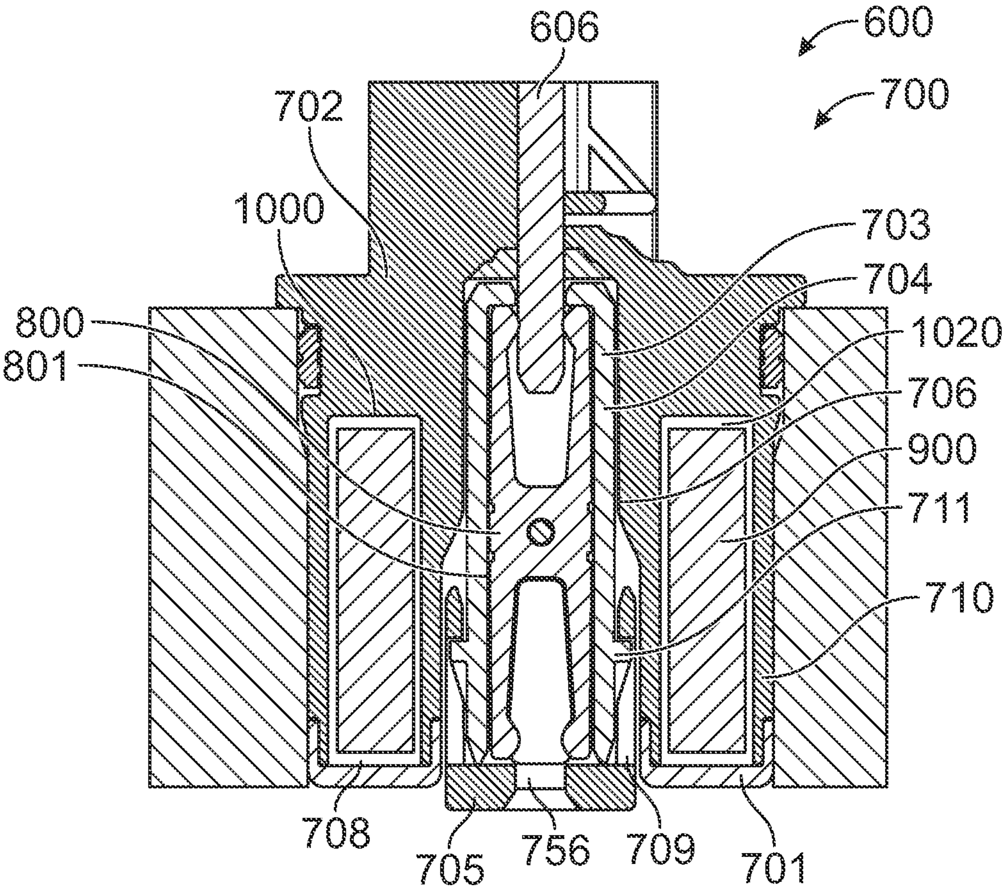
FIG. 21 is an end cross sectional view of the header power connector in accordance with an exemplary embodiment.

FIG. 20 is a side cross sectional view of the header power connector 600 in accordance with an exemplary embodiment. FIG. 21 is an end cross sectional view of the header power connector 600 in accordance with an exemplary embodiment.

During assembly, the terminal assemblies 801 are loaded into the terminal holder 703 of the inner housing 704. The terminal assembly retainer 705 is coupled to the terminal holder 703 to retain the terminal assemblies 801 in the terminal channels 756. In an exemplary embodiment, the terminal channels 756 are oversized relative to the terminals

800 to allow movement of the terminals 800 in the terminal channels 756. For example, the terminals 800 may be rotated or shifted within the terminal channels 756 (for example, have a limited amount of floating movement) to accommodate misalignment of the busbars 606, 608, such as when the busbars are laterally or rotationally offset from each other.

In an exemplary embodiment, the cavity 706 of the outer housing 702 includes the choke chamber 708 and the terminal chamber 709. The separating wall 711 separates the choke chamber 708 from the terminal chamber 709. The inner housing 704 and the terminal assemblies 801 are received in the terminal chamber 709. The terminal chamber 709 is located interior of the separating wall 711. The separating wall 711 surrounds the inner housing 704 and the terminal assemblies 801. In an exemplary embodiment, the terminal chamber 709 is oversized relative to the inner housing 704 to allow movement of the inner housing 704 in the terminal chamber 709. For example, the inner housing 704 may be rotated or shifted within the terminal chamber 709 (for example, have a limited amount of floating movement) to accommodate misalignment of the busbars 606, 608, such as when the busbars are laterally or rotationally offset from each other. In an exemplary embodiment, the separating wall 711 has a similar height as the outer wall 710. The cover 701 is coupled to the distal ends of the outer wall 710 and the separating wall 711. In an exemplary embodiment, the separating wall 711 extends at or beyond the inner housing 704. For example, the inner housing 704 is completely contained within the terminal chamber 709. The inner housing 704 is a separate housing for the terminals that protects the terminals from mechanical shocks and vibration effects propagated from the choke movement within the cavity 706, such as wear, increased resistance, over heating and thermal events. The separating wall 711 isolates the terminals 800 from the choke to protect the terminals from mechanical shocks and vibration effects propagated from the choke movement within the cavity 706, such as wear, increased resistance, over heating and thermal events. The inner housing 704 and the separating wall 711 create a stable surrounding environment for the terminals 800 with consistent contact resistance and temperatures. The separating wall 711 allows the inner housing 704 to move within the cavity 706 independent of the choke for alignment with the busbars 606, 608.

The choke chamber 708 is defined between the outer wall 710 and the separating wall 711. The choke 900 is received in the choke chamber 708. The choke 900 surrounds the terminal assemblies 801. The cover 701 retains the choke 900 in the choke chamber 708. The separating wall 711 is used to separate the choke 900 from the terminal assemblies 801. The separating wall 711 holds the choke 900 relative to the terminal assemblies 801. For example, the separating wall 711 separates the choke 900 from the terminal assemblies 801 to physically isolate the choke 900 from the terminal assemblies 801, such as to reduce wear or damage to the terminal assemblies 801 from movement (for example, vibration) of the choke 900 within the electric vehicle. The separating wall 711 separates the choke 900 from the terminal assemblies 801 to allow movement of the terminal assemblies 801 within the header housing assembly 700, such as for alignment of the terminal assemblies 801 to the busbars 606, 608 during mating, without interference from the choke 900.

In an exemplary embodiment, the choke positioner 1000 may position the choke 900 in the choke chamber 708. In various embodiments, the choke chamber 708 may be oversized relative to the choke 900 to allow easy positioning of the choke 900 within the cavity 706. For example, because the choke 900 may have poor manufacturing tolerance, the choke chamber 708 is oversized to ensure that the choke 900 may fit within the choke chamber 708. The extra space or gaps may allow the choke 900 to have freedom of movement relative to the header housing assembly 700. However, the choke positioner(s) 1000 are used to limit such freedom of movement of the choke 900 once positioned in the cavity 706. For example, the choke positioner(s) 1000 may physically restrain the choke 900 and limit movement (for example, side-to-side and/or front-to-rear and/or top-to-bottom). FIGS. 20 and 21 illustrate the choke positioner 1000 as a vertical choke positioners 1020 at the top of the choke chamber 708. The vertical choke positioner may be compressible to occupy space between the choke 900 and the outer housing 702. The vertical choke positioner may absorb vertical movement of the choke 900 within the choke chamber 708.

Figure 22:
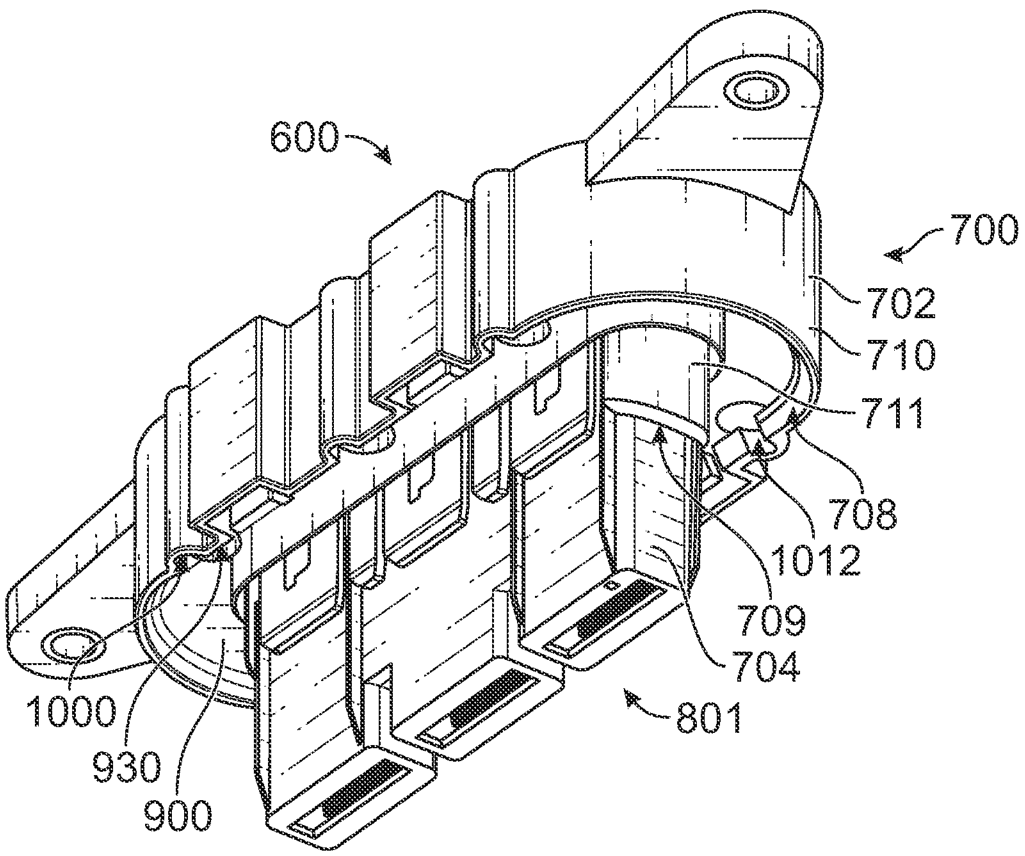
FIG. 22 illustrates a header power connector in accordance with an exemplary embodiment.
Figure 23:
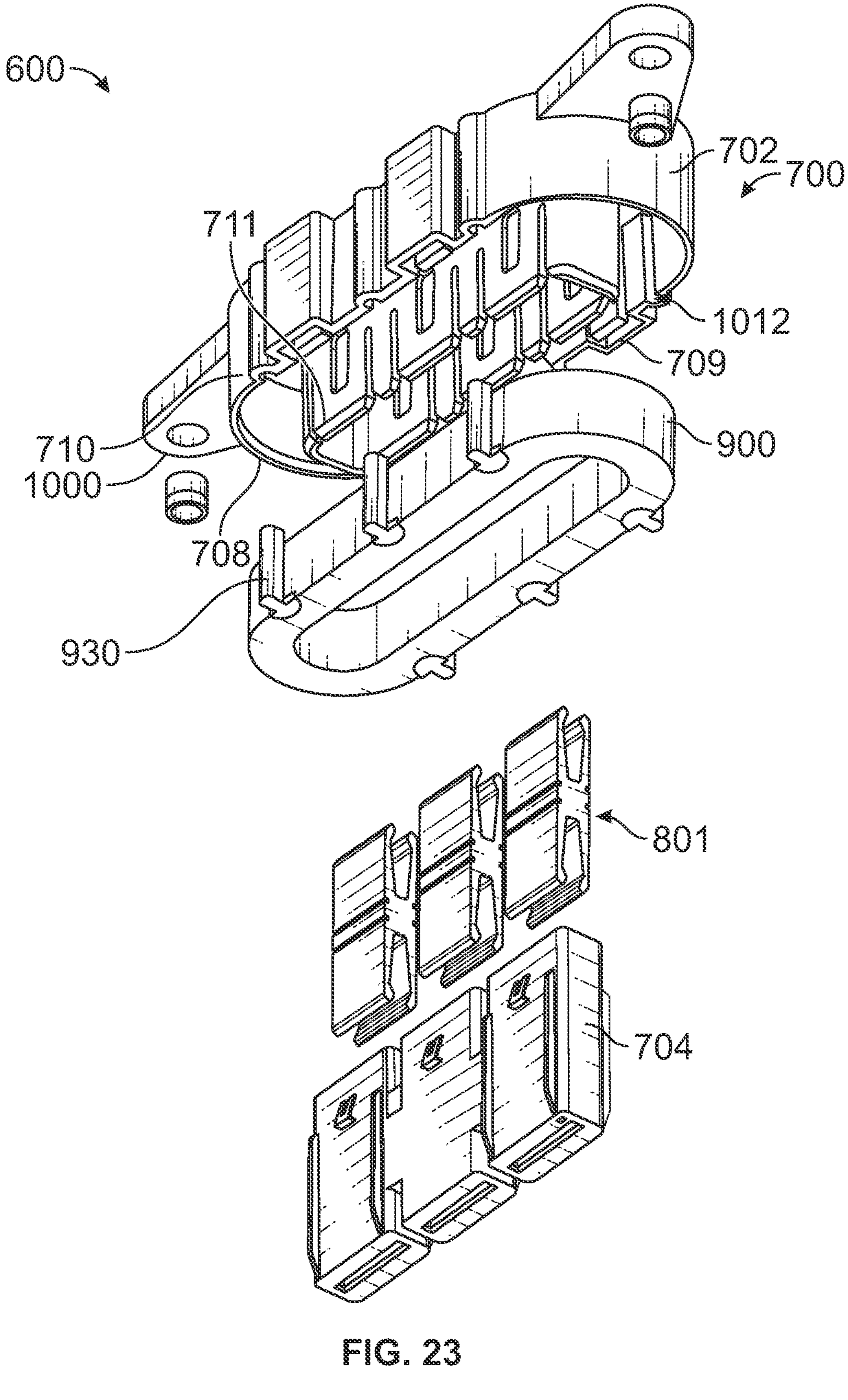
FIG. 23 is an exploded view of the header power connector in accordance with an exemplary embodiment.
Figure 24:
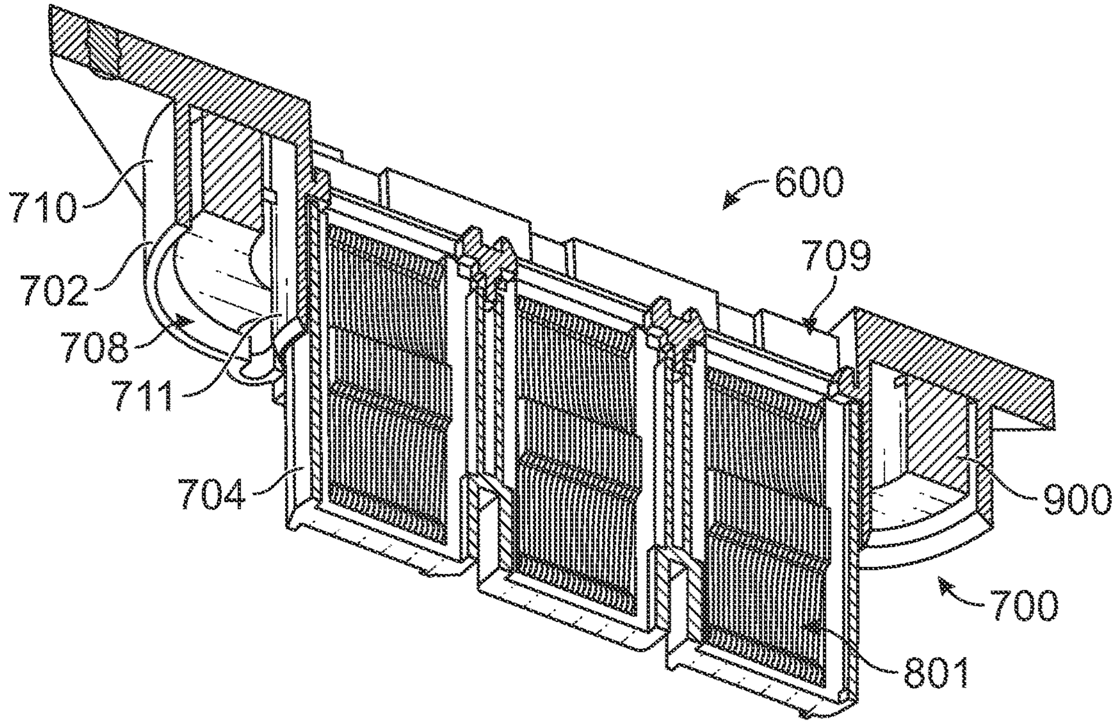
FIG. 24 is a side sectional view of the header power connector in accordance with an exemplary embodiment.
Figure 25:
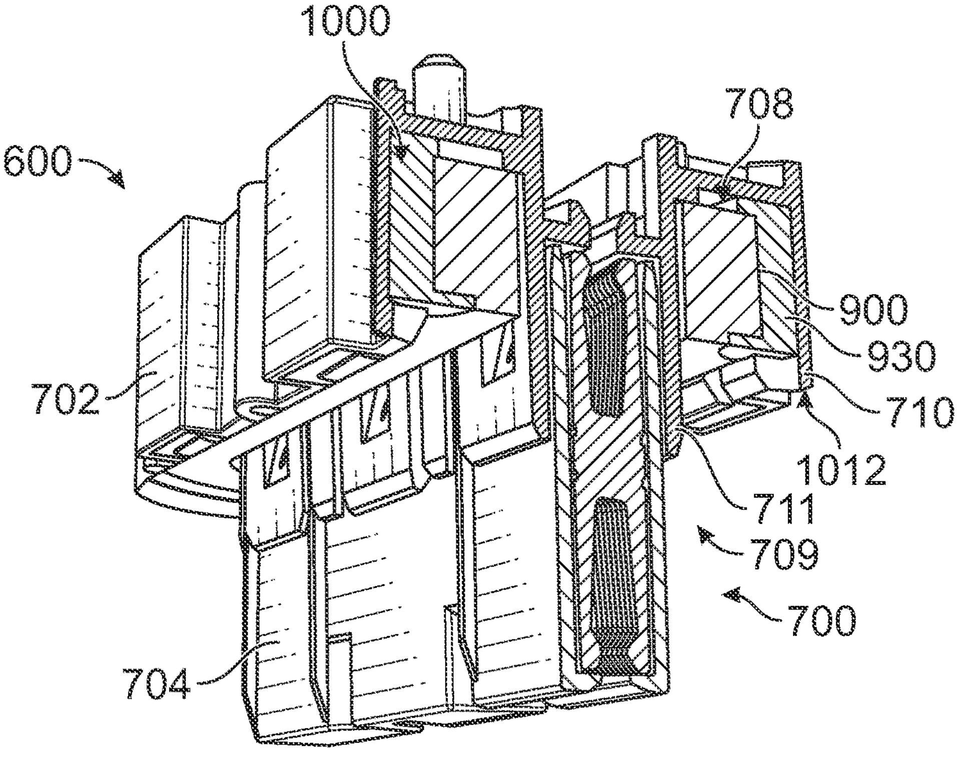
FIG. 25 is an end sectional view of the header power connector in accordance with an exemplary embodiment.

FIG. 22 illustrates a header power connector 600 in accordance with an exemplary embodiment. FIG. 23 is an exploded view of the header power connector 100 in accordance with an exemplary embodiment. FIG. 24 is a side sectional view of the header power connector 600 in accordance with an exemplary embodiment. FIG. 25 is an end sectional view of the header power connector 600 in accordance with an exemplary embodiment. The header power connector 600 shown in FIGS. 22-25 is similar to the header power connector 600 shown in FIGS. 14-21 but includes different holding structures for holding the terminal assemblies 801 and the choke 900. For example, the outer housing 702 is shaped differently and/or includes different components.

The header power connector 600 includes the header housing assembly 700, the terminal assemblies 801 held by the header housing assembly 700, the choke 900 held by the header housing assembly 700, and the choke positioner 1000 for positioning the choke 900 in the header housing assembly 700. The choke 900 surrounds the terminal assemblies 801 to cancel EMI for high frequency electronic noise suppression for the terminal assemblies 801. The choke 900 improves operation of the header power connector 600. The header housing assembly 700 holds the choke 900 relative to the terminal assemblies 801. For example, the header housing assembly 700 separates the choke 900 from the terminal assemblies 801 to physically isolate the choke 900 from the terminal assemblies 801, such as to reduce wear or damage to the terminal assemblies 801 from movement (for example, vibration) of the choke 900 within the electric vehicle. The header housing assembly 700 separates the choke 900 from the terminal assemblies 801 to allow movement of the terminal assemblies 801 within the header housing assembly 700, such as for alignment of the terminal assemblies 801 to the busbars 606, 608 during mating.

In the illustrated embodiment, the outer wall 710 and the separating wall 711 are shorter than in the embodiment shown in FIGS. 14-21. For example, the inner housing 704 and the terminal assemblies 801 protrude beyond (for example, below) the distal ends of the outer wall 710 and the separating wall 711. The choke chamber 708 and the terminal chamber 709 are shorter in the illustrated embodiment.

In the illustrated embodiment, the choke positioner 1000 includes channels 1012 that receive locating ribs 930 extending from the choke 900. The walls of the channels 1012 are used to position the choke 900 within the choke chamber 708 relative to the terminal assemblies 801. For example, the channels 1012 may center the choke 900 in the choke chamber 708 and the walls of the channels 1012 may limit or restrict side-to-side and/or end-to-end movement of the choke 900 within the choke chamber 708. Optionally, crush ribs or other features may be provided in the channels 1012 to tightly hold the locating ribs 930 in the channels 1012. Other types of horizontal choke positioners may be used in alternative embodiments.

Figure 26:
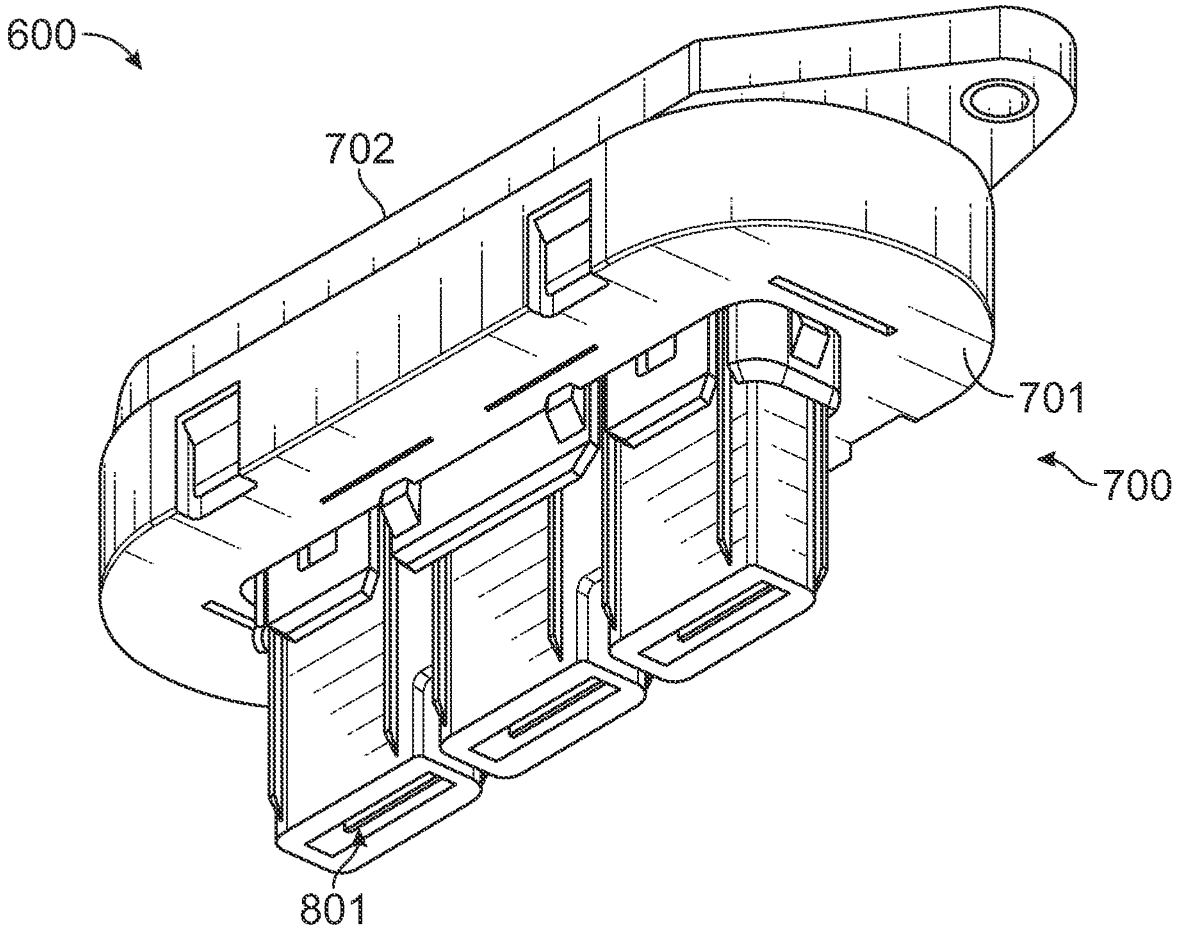
FIG. 26 illustrates a header power connector in accordance with an exemplary embodiment.
Figure 27:
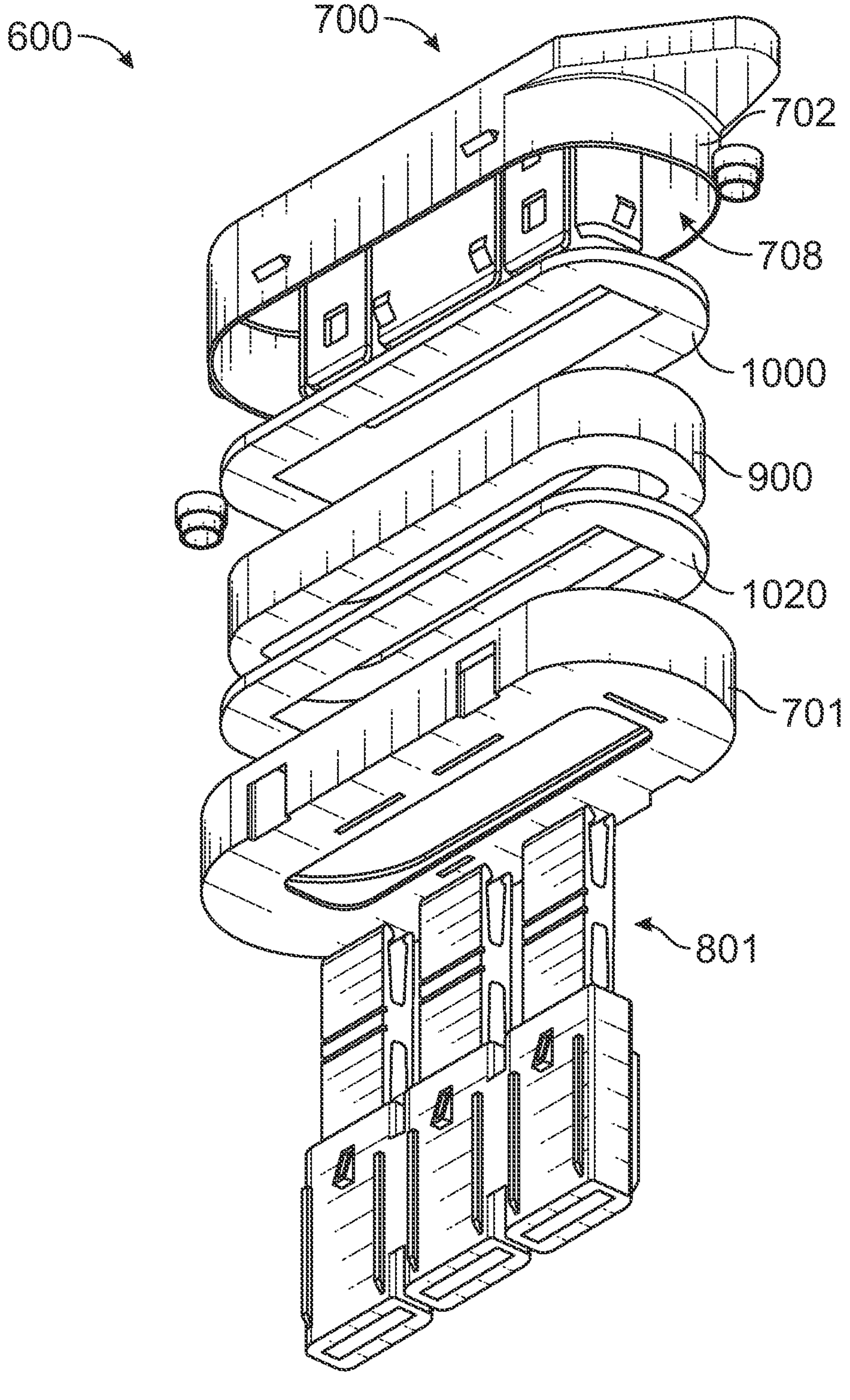
FIG. 27 is an exploded view of the header power connector in accordance with an exemplary embodiment.

FIG. 26 illustrates a header power connector 600 in accordance with an exemplary embodiment. FIG. 27 is an exploded view of the header power connector 100 in accordance with an exemplary embodiment. The header power connector 600 shown in FIGS. 26-27 is similar to the header power connector 600 shown in FIGS. 22-25 but includes different holding structures for holding the terminal assemblies 801 and the choke 900. For example, the cover 701 is used to retain the choke 900 in the outer housing 702. Additionally, different types of choke positioners 1000 are used.

The header power connector 600 includes the header housing assembly 700, the terminal assemblies 801 held by the header housing assembly 700, the choke 900 held by the header housing assembly 700, and the choke positioners 1000 for positioning the choke 900 in the header housing assembly 700. The choke 900 surrounds the terminal assemblies 801 to cancel EMI for high frequency electronic noise suppression for the terminal assemblies 801. The choke 900 improves operation of the header power connector 600. The header housing assembly 700 holds the choke 900 relative to the terminal assemblies 801. For example, the header housing assembly 700 separates the choke 900 from the terminal assemblies 801 to physically isolate the choke 900 from the terminal assemblies 801, such as to reduce wear or damage to the terminal assemblies 801 from movement (for example, vibration) of the choke 900 within the electric vehicle. The header housing assembly 700 separates the choke 900 from the terminal assemblies 801 to allow movement of the terminal assemblies 801 within the header housing assembly 700, such as for alignment of the terminal assemblies 801 to the busbars 606, 608 during mating.

In the illustrated embodiment, the choke positioner 1000 includes the vertical choke positioners 1020 configured to be stacked in the choke chamber 708 above and below the choke 900 to vertically position the choke 900 in the choke chamber 708. The choke 900 is configured to be sandwiched between the upper and lower vertical choke positioners 1020. The vertical choke positioners 1020 are compressible and are configured to absorb vertical movements of the choke 900 within the header housing assembly 700, such as from vibrations. Other types of vertical choke positioners may be used in alternative embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A header power connector comprising:

a header housing assembly including an outer housing having an outer wall forming a cavity and a separating wall separating the cavity into a choke chamber and a terminal chamber, the outer housing extending between a top and a bottom, the outer housing configured to receive an upper busbar in the cavity through the top, the outer housing configured to receive a lower busbar in the cavity through the bottom, the header housing assembly including an inner housing received in the terminal chamber, the inner housing including a terminal channel;

a terminal assembly received in the terminal chamber, the terminal assembly being held in the terminal channel of the inner housing, the terminal assembly including a plurality of terminals arranged in a terminal stack, each terminal including an upper mating end having an upper socket configured to receive the upper busbar and a lower mating end having a lower socket configured to receive the lower busbar, the terminals configured to electrically connect the upper and lower busbars; and a choke received in the choke chamber between the outer wall and the separating wall, the choke having a choke body surrounding the terminal assembly, the choke body having an opening therethrough receiving the terminal assembly.

2. The header power connector of claim 1, wherein the separating wall is located between the choke and the inner housing.

3. The header power connector of claim 1, wherein the inner housing is coupled to the separating wall.

4. The header power connector of claim 1, wherein the separating wall includes an inner surface facing the inner housing and an outer surface facing the choke.

5. The header power connector of claim 1, wherein the separating wall extends to a distal edge, the distal edge extending beyond an end of the inner housing and the terminal assembly.

6. The header power connector of claim 1, further comprising a choke positioner in the cavity, the choke positioner interfacing with the choke to position the choke relative to the outer housing.

7. The header power connector of claim 6, wherein the choke is loaded into the cavity in a loading direction, the choke positioner positioning the choke in a lateral direction perpendicular to the loading direction.

8. The header power connector of claim 6, wherein the choke includes a first side and a second side extending between a top and a bottom of the choke, the choke positioner holding a side-to-side positioning of the choke relative to the outer housing.

9. The header power connector of claim 6, wherein the choke includes a front and a rear extending between a first side and a second side, the contact positioner holding a front-to-rear position of the choke relative to the outer housing.

10. The header power connector of claim 6, wherein the choke positioner is coupled to a top of the choke to vertically position the choke within the cavity.

11. The header power connector of claim 6, wherein the contact positioner is compressible between the choke and the header housing assembly.

12. The header power connector of claim 1, wherein the outer housing includes a channel along an inner surface of the outer wall open to the cavity defining the horizontal contact positioner, the choke including a locating rib received in the channel to position the choke relative to the outer wall.

13. A header power connector comprising:

a header housing assembly including an outer housing having an outer wall forming a cavity and a separating wall separating the cavity into a choke chamber and a terminal chamber, the outer housing extending between a top and a bottom, the outer housing having a first side and a second side, the outer housing having a front and a rear, the outer housing configured to receive an upper busbar in the cavity through the top, the outer housing configured to receive a lower busbar in the cavity through the bottom, the header housing assembly including an inner housing received in the terminal chamber, the inner housing including a terminal channel;

a terminal assembly received in the terminal chamber, the terminal assembly being held in the terminal channel of the inner housing, the terminal assembly received in the cavity, the terminal assembly including a plurality of terminals arranged in a terminal stack, each terminal including an upper mating end having an upper socket configured to receive the upper busbar and a lower mating end having a lower socket configured to receive the lower busbar, the terminals configured to electrically connect the upper and lower busbars;

a choke received in the choke chamber between the outer wall and the separating wall, the choke having a choke body surrounding the terminal assembly, the choke body having an opening therethrough receiving the terminal assembly; and a horizontal choke positioner in the choke chamber, the choke positioner interfacing with the choke to horizontally position the choke relative to the outer housing between the first side and the second side;

a vertical choke positioner in the choke chamber, the choke positioner interfacing with the choke to vertically position the choke relative to the outer housing between the top and the bottom.

14. The header power connector of claim 13, wherein the separating wall is located between the choke and the inner housing.

15. The header power connector of claim 13, wherein the inner housing is coupled to the separating wall.

16. The header power connector of claim 13, wherein the separating wall includes an inner surface facing the inner housing and an outer surface facing the choke.

17. The header power connector of claim 13, wherein the separating wall extends to a distal edge, the distal edge extending beyond an end of the inner housing and the terminal assembly.

18. The header power connector of claim 13, wherein the choke is loaded into the cavity in a loading direction, the horizontal choke positioner positioning the choke in a lateral direction perpendicular to the loading direction, the vertical choke positioner positioning the choke in a vertical direction parallel to the loading direction.

19. The header power connector of claim 13, wherein the choke includes a first side and a second side extending between a top and a bottom of the choke, the horizontal choke positioner holding a side-to-side positioning of the choke relative to the outer housing.

20. A power connector system comprising:

an upper busbar for powering a first electrical component, the upper busbar having an upper busbar edge;

a lower busbar for powering a second electrical component, the lower busbar having a lower busbar edge; and a header power connector for electrically connecting the upper busbar with the lower busbar to transfer power between the first and second electrical components, the header power connector comprising:

a header housing assembly including an outer housing having an outer wall forming a cavity and a separating wall separating the cavity into a choke chamber and a terminal chamber, the outer housing extending between a top and a bottom, the outer housing receiving the upper busbar in the cavity through the top, the outer housing receiving the lower busbar in the cavity through the bottom, the header housing assembly including an inner housing received in the terminal chamber, the inner housing including a terminal channel;

a terminal assembly received in the terminal chamber, the terminal assembly being held in the terminal channel of the inner housing, the terminal assembly received in the cavity, the terminal assembly including a plurality of terminals arranged in a terminal stack, each terminal including an upper mating end having an upper socket configured to receive the upper busbar and a lower mating end having a lower socket configured to receive the lower busbar, the terminals configured to electrically connect the upper and lower busbars; and a choke received in the choke chamber between the outer wall and the separating wall, the choke having a choke body surrounding the terminal assembly, the choke body having an opening therethrough receiving the terminal assembly.

* * * * *